United States Patent
Abhyanker

(10) Patent No.: US 8,769,393 B1
(45) Date of Patent: *Jul. 1, 2014

(54) PRIVATE NEIGHBORHOOD SOCIAL NETWORK, SYSTEMS, AND METHODS

(71) Applicant: Raj Abhyanker, Cupertino, CA (US)

(72) Inventor: Raj Abhyanker, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/201,788

(22) Filed: Mar. 7, 2014

Related U.S. Application Data

(63) Continuation of application No. 11/827,400, filed on Jul. 10, 2007.

(51) Int. Cl.
*G06F 17/00* (2006.01)
*G06F 17/30* (2006.01)

(52) U.S. Cl.
CPC .............................. *G06F 17/30386* (2013.01)
USPC ....................................................... 715/201

(58) Field of Classification Search
USPC ....................................................... 715/201
See application file for complete search history.

(56) References Cited

U.S. PATENT DOCUMENTS

| | | | |
|---|---|---|---|
| 2,035,218 A | 3/1936 | Bloom | |
| 5,325,294 A | 6/1994 | Keene | |
| 5,581,630 A | 12/1996 | Bonneau, Jr. | |
| 5,590,062 A | 12/1996 | Nagamitsu et al. | |
| 5,671,342 A * | 9/1997 | Millier et al. | 345/418 |
| 5,805,810 A | 9/1998 | Maxwell | |
| 5,905,499 A | 5/1999 | McDowall et al. | |
| 5,926,765 A | 7/1999 | Sasaki | |
| 5,940,806 A | 8/1999 | Danial | |
| 6,024,288 A | 2/2000 | Gottlich et al. | |
| 6,034,618 A | 3/2000 | Tatebayashi et al. | |
| 6,036,601 A | 3/2000 | Heckel | |
| 6,047,194 A | 4/2000 | Andersson | |
| 6,088,702 A | 7/2000 | Plantz et al. | |
| 6,229,533 B1 | 5/2001 | Farmer et al. | |
| 6,308,177 B1 | 10/2001 | Israni et al. | |
| 6,317,718 B1 | 11/2001 | Fano | |
| 6,336,111 B1 | 1/2002 | Ashby et al. | |
| 6,401,085 B1 | 6/2002 | Gershman et al. | |
| 6,408,307 B1 | 6/2002 | Semple et al. | |
| 6,498,982 B2 | 12/2002 | Bellesfield et al. | |
| 6,532,007 B1 | 3/2003 | Matsuda | |

(Continued)

OTHER PUBLICATIONS

Chen et al., Geotracker: Geospatial and Temporal RSS Navigation, p. 41-50 (World Wide Web Conference 2007, ACM, May 8-12, 2007).*

(Continued)

*Primary Examiner* — Frank D Mills
(74) *Attorney, Agent, or Firm* — Raj Abhyanker, P.C.

(57) ABSTRACT

Disclosed are a method and system of private neighborhood social networks, according to one embodiment. In one aspect, a method of providing users of information with timely information about a news story related to the geographic locations of the users includes receiving a submission of a news story from the Internet via a computer network interface device. A contact database is searched to select users whose geographic locations indicate a proximity to the geographic location of the news story. The selected users are provided with the geographic location of the news story, the description of the details of the news story, and the information related to items associated with the news story. An interested user is enabled to form an immediate communication in the form of an online interview with a neighboring user surrounding the specific geographic location of the news story.

19 Claims, 15 Drawing Sheets

(56) References Cited

U.S. PATENT DOCUMENTS

| | | |
|---|---|---|
| 6,557,013 B1 | 4/2003 | Ziff et al. |
| 6,615,039 B1 | 9/2003 | Eldering |
| 6,643,663 B1 | 11/2003 | Dabney et al. |
| 6,647,383 B1 | 11/2003 | August et al. |
| 6,658,410 B1 | 12/2003 | Sakamaki et al. |
| 6,662,016 B1 | 12/2003 | Buckham et al. |
| 6,716,101 B1 | 4/2004 | Meadows et al. |
| 6,719,570 B2 | 4/2004 | Tsuchioka |
| 6,721,748 B1 | 4/2004 | Knight et al. |
| 6,745,196 B1 | 6/2004 | Colyer et al. |
| 6,798,407 B1 | 9/2004 | Benman |
| 6,834,229 B2 | 12/2004 | Rafiah et al. |
| 6,882,307 B1 | 4/2005 | Gifford |
| 6,950,791 B1 | 9/2005 | Bray et al. |
| 6,968,179 B1 | 11/2005 | De Vries |
| 6,987,976 B2 | 1/2006 | Kohar et al. |
| 7,006,881 B1 | 2/2006 | Hoffberg et al. |
| 7,024,455 B2 | 4/2006 | Yokobori et al. |
| 7,080,019 B1 | 7/2006 | Hurzeler |
| 7,080,096 B1 | 7/2006 | Imamura |
| 7,158,878 B2 | 1/2007 | Rasmussen et al. |
| 7,177,872 B2 | 2/2007 | Schwesig et al. |
| 7,188,153 B2 | 3/2007 | Lunt et al. |
| 7,251,647 B2 | 7/2007 | Hoblit |
| 7,293,019 B2 | 11/2007 | Dumais et al. |
| 7,296,026 B2 | 11/2007 | Patrick et al. |
| 7,353,034 B2 | 4/2008 | Haney |
| 7,353,114 B1 * | 4/2008 | Rohlf et al. ............ 702/5 |
| 7,359,871 B1 | 4/2008 | Paasche et al. |
| 7,383,251 B2 | 6/2008 | Might |
| 7,386,542 B2 | 6/2008 | Maybury et al. |
| 7,424,438 B2 | 9/2008 | Vianello |
| 7,433,832 B1 | 10/2008 | Bezos et al. |
| 7,433,868 B1 | 10/2008 | Satomi et al. |
| 7,437,368 B1 | 10/2008 | Kolluri et al. |
| 7,441,031 B2 | 10/2008 | Shrinivasan et al. |
| 7,447,771 B1 | 11/2008 | Taylor |
| 7,477,285 B1 | 1/2009 | Johnson |
| 7,478,324 B1 | 1/2009 | Ohtsu |
| 7,505,919 B2 | 3/2009 | Richardson |
| 7,562,023 B2 | 7/2009 | Yamamoto |
| 7,587,276 B2 | 9/2009 | Gold et al. |
| 7,664,233 B1 * | 2/2010 | Kirchmeier et al. ............ 379/37 |
| 7,801,542 B1 * | 9/2010 | Stewart ................ 455/518 |
| 7,812,717 B1 | 10/2010 | Cona et al. |
| 7,840,224 B2 * | 11/2010 | Vengroff et al. ............ 455/456.1 |
| 7,895,263 B1 * | 2/2011 | Kirchmeier et al. ......... 709/203 |
| 2001/0020955 A1 | 9/2001 | Nakagawa et al. |
| 2001/0036833 A1 | 11/2001 | Koshima et al. |
| 2001/0042087 A1 | 11/2001 | Kephart et al. |
| 2001/0049616 A1 | 12/2001 | Khuzadi et al. |
| 2001/0049636 A1 | 12/2001 | Hudda et al. |
| 2002/0026388 A1 | 2/2002 | Roebuck |
| 2002/0030689 A1 | 3/2002 | Eichel et al. |
| 2002/0038225 A1 | 3/2002 | Klasky et al. |
| 2002/0049617 A1 | 4/2002 | Lencki et al. |
| 2002/0065691 A1 * | 5/2002 | Twig et al. ............ 705/7 |
| 2002/0070967 A1 * | 6/2002 | Tanner et al. ............ 345/764 |
| 2002/0077901 A1 | 6/2002 | Katz |
| 2002/0078171 A1 | 6/2002 | Schneider |
| 2002/0087506 A1 | 7/2002 | Reddy |
| 2002/0090996 A1 | 7/2002 | Maehiro |
| 2002/0091556 A1 | 7/2002 | Fiala et al. |
| 2002/0097267 A1 | 7/2002 | Dinan et al. |
| 2002/0103892 A1 | 8/2002 | Rieger |
| 2002/0130906 A1 | 9/2002 | Miyaki |
| 2002/0147638 A1 | 10/2002 | Banerjee et al. |
| 2002/0156917 A1 | 10/2002 | Nye |
| 2002/0169662 A1 | 11/2002 | Claiborne |
| 2002/0184496 A1 | 12/2002 | Mitchell et al. |
| 2003/0004802 A1 | 1/2003 | Callegari |
| 2003/0005035 A1 | 1/2003 | Rodgers |
| 2003/0018521 A1 * | 1/2003 | Kraft et al. ............ 705/14 |
| 2003/0023489 A1 | 1/2003 | McGuire et al. |
| 2003/0023586 A1 | 1/2003 | Knorr |
| 2003/0154213 A1 | 8/2003 | Ahn |
| 2003/0177019 A1 | 9/2003 | Santos et al. |
| 2003/0177192 A1 | 9/2003 | Umeki et al. |
| 2003/0200192 A1 * | 10/2003 | Bell et al. ............ 707/1 |
| 2003/0218253 A1 | 11/2003 | Avanzino et al. |
| 2004/0030525 A1 | 2/2004 | Robinson et al. |
| 2004/0030741 A1 | 2/2004 | Wolton et al. |
| 2004/0054428 A1 | 3/2004 | Sheha et al. |
| 2004/0109012 A1 | 6/2004 | Kraus et al. |
| 2004/0111302 A1 | 6/2004 | Falk et al. |
| 2004/0128215 A1 | 7/2004 | Florance et al. |
| 2004/0135805 A1 | 7/2004 | Gottsacker et al. |
| 2004/0139049 A1 | 7/2004 | Hancock et al. |
| 2004/0153466 A1 | 8/2004 | Ziff et al. |
| 2004/0162064 A1 | 8/2004 | Himmelstein |
| 2004/0166878 A1 | 8/2004 | Erskine et al. |
| 2004/0167787 A1 | 8/2004 | Lynch et al. |
| 2004/0186766 A1 | 9/2004 | Fellenstein et al. |
| 2004/0215559 A1 | 10/2004 | Rebenack et al. |
| 2004/0215793 A1 * | 10/2004 | Ryan et al. ............ 709/229 |
| 2004/0217884 A1 * | 11/2004 | Samadani et al. ....... 340/995.14 |
| 2004/0217980 A1 | 11/2004 | Radburn et al. |
| 2004/0257340 A1 | 12/2004 | Jawerth |
| 2004/0260604 A1 | 12/2004 | Bedingfield |
| 2005/0018177 A1 | 1/2005 | Rosenberg et al. |
| 2005/0021750 A1 | 1/2005 | Abrams |
| 2005/0027723 A1 | 2/2005 | Jones et al. |
| 2005/0034075 A1 * | 2/2005 | Riegelman et al. ............ 715/714 |
| 2005/0044061 A1 | 2/2005 | Klemow |
| 2005/0049971 A1 * | 3/2005 | Bettinger ............ 705/51 |
| 2005/0055353 A1 * | 3/2005 | Marx et al. ............ 707/10 |
| 2005/0091027 A1 | 4/2005 | Zaher et al. |
| 2005/0096977 A1 | 5/2005 | Rossides |
| 2005/0114783 A1 | 5/2005 | Szeto |
| 2005/0131761 A1 | 6/2005 | Trika et al. |
| 2005/0137015 A1 | 6/2005 | Rogers et al. |
| 2005/0143174 A1 | 6/2005 | Goldman et al. |
| 2005/0171832 A1 | 8/2005 | Hull et al. |
| 2005/0171954 A1 | 8/2005 | Hull et al. |
| 2005/0187823 A1 | 8/2005 | Howes |
| 2005/0192859 A1 | 9/2005 | Mertins et al. |
| 2005/0192912 A1 | 9/2005 | Bator et al. |
| 2005/0192999 A1 | 9/2005 | Cook et al. |
| 2005/0197775 A1 * | 9/2005 | Smith ............ 702/3 |
| 2005/0197846 A1 | 9/2005 | Pezaris et al. |
| 2005/0216186 A1 | 9/2005 | Dorfman et al. |
| 2005/0240580 A1 | 10/2005 | Zamir et al. |
| 2005/0251331 A1 * | 11/2005 | Kreft ............ 701/207 |
| 2005/0273346 A1 | 12/2005 | Frost |
| 2005/0283497 A1 | 12/2005 | Nurminen et al. |
| 2005/0288958 A1 * | 12/2005 | Eraker et al. ............ 705/1 |
| 2006/0004703 A1 | 1/2006 | Spivack et al. |
| 2006/0004734 A1 | 1/2006 | Malkin et al. |
| 2006/0023881 A1 | 2/2006 | Akiyama et al. |
| 2006/0036748 A1 | 2/2006 | Nusbaum et al. |
| 2006/0089882 A1 | 4/2006 | Shimansky |
| 2006/0123053 A1 | 6/2006 | Scannell |
| 2006/0136127 A1 | 6/2006 | Coch et al. |
| 2006/0136419 A1 | 6/2006 | Brydon et al. |
| 2006/0149624 A1 | 7/2006 | Baluja et al. |
| 2006/0178972 A1 | 8/2006 | Jung et al. |
| 2006/0200384 A1 | 9/2006 | Arutunian et al. ............ 705/14 |
| 2006/0238383 A1 * | 10/2006 | Kimchi et al. ............ 340/995.1 |
| 2006/0248573 A1 | 11/2006 | Pannu et al. |
| 2006/0270421 A1 | 11/2006 | Phillips et al. |
| 2007/0002057 A1 | 1/2007 | Danzig et al. |
| 2007/0003182 A1 | 1/2007 | Hunn |
| 2007/0011148 A1 | 1/2007 | Burkey et al. |
| 2007/0011617 A1 | 1/2007 | Akagawa et al. |
| 2007/0033064 A1 | 2/2007 | Abrahamsohn |
| 2007/0033182 A1 * | 2/2007 | Knorr ............ 707/5 |
| 2007/0078747 A1 | 4/2007 | Baack |
| 2007/0105536 A1 | 5/2007 | Tingo |
| 2007/0106627 A1 | 5/2007 | Srivastava et al. |
| 2007/0112729 A1 | 5/2007 | Wiseman et al. |
| 2007/0150375 A1 | 6/2007 | Yang |
| 2007/0150603 A1 | 6/2007 | Crull et al. |
| 2007/0162547 A1 | 7/2007 | Ross |
| 2007/0162942 A1 | 7/2007 | Hamynen et al. |

(56) References Cited

U.S. PATENT DOCUMENTS

| | | | |
|---|---|---|---|
| 2007/0167204 A1 | 7/2007 | Lyle et al. | |
| 2007/0203644 A1* | 8/2007 | Thota et al. | 701/211 |
| 2007/0208802 A1 | 9/2007 | Barman et al. | |
| 2007/0233291 A1 | 10/2007 | Herde et al. | |
| 2007/0233367 A1* | 10/2007 | Chen et al. | 701/207 |
| 2007/0233375 A1 | 10/2007 | Garg et al. | |
| 2007/0239552 A1 | 10/2007 | Sundaresan | |
| 2007/0245002 A1 | 10/2007 | Nguyen et al. | |
| 2007/0250321 A1 | 10/2007 | Balusu | |
| 2007/0260599 A1 | 11/2007 | McGuire et al. | |
| 2007/0266097 A1* | 11/2007 | Harik et al. | 709/204 |
| 2007/0271367 A1* | 11/2007 | Yardeni et al. | 709/223 |
| 2007/0273558 A1 | 11/2007 | Smith et al. | |
| 2007/0281689 A1* | 12/2007 | Altman et al. | 455/435.1 |
| 2007/0281690 A1* | 12/2007 | Altman et al. | 455/435.1 |
| 2007/0281716 A1* | 12/2007 | Altman et al. | 455/466 |
| 2007/0282621 A1* | 12/2007 | Altman et al. | 705/1 |
| 2007/0288621 A1 | 12/2007 | Gundu et al. | |
| 2007/0294357 A1 | 12/2007 | Antoine | |
| 2008/0005231 A1 | 1/2008 | Kelley et al. | |
| 2008/0020814 A1 | 1/2008 | Kernene | |
| 2008/0032666 A1* | 2/2008 | Hughes et al. | 455/404.1 |
| 2008/0032703 A1* | 2/2008 | Krumm et al. | 455/456.1 |
| 2008/0033641 A1* | 2/2008 | Medalia | 701/209 |
| 2008/0033652 A1* | 2/2008 | Hensley et al. | 702/5 |
| 2008/0051932 A1 | 2/2008 | Jermyn et al. | |
| 2008/0065321 A1* | 3/2008 | Dacosta | 701/208 |
| 2008/0070593 A1 | 3/2008 | Altman et al. | |
| 2008/0071929 A1 | 3/2008 | Motte et al. | |
| 2008/0077642 A1 | 3/2008 | Carbone et al. | |
| 2008/0086368 A1 | 4/2008 | Bauman et al. | |
| 2008/0091723 A1* | 4/2008 | Zuckerberg et al. | 707/104.1 |
| 2008/0097999 A1* | 4/2008 | Horan | 707/10 |
| 2008/0098090 A1* | 4/2008 | Geraci et al. | 709/219 |
| 2008/0104227 A1 | 5/2008 | Birnie et al. | |
| 2008/0109718 A1* | 5/2008 | Narayanaswami | 715/262 |
| 2008/0115082 A1 | 5/2008 | Simmons et al. | |
| 2008/0125969 A1* | 5/2008 | Chen et al. | 701/211 |
| 2008/0126355 A1 | 5/2008 | Rowley | |
| 2008/0126476 A1 | 5/2008 | Nicholas et al. | |
| 2008/0126478 A1 | 5/2008 | Ferguson et al. | |
| 2008/0148156 A1 | 6/2008 | Brewer et al. | |
| 2008/0154733 A1 | 6/2008 | Wolfe | |
| 2008/0155019 A1 | 6/2008 | Wallace et al. | |
| 2008/0162211 A1* | 7/2008 | Addington | 705/7 |
| 2008/0162260 A1 | 7/2008 | Rohan et al. | |
| 2008/0168068 A1* | 7/2008 | Hutheesing | 707/10 |
| 2008/0168175 A1 | 7/2008 | Tran | |
| 2008/0172173 A1 | 7/2008 | Chang et al. | |
| 2008/0172244 A1* | 7/2008 | Coupal et al. | 705/1 |
| 2008/0172288 A1* | 7/2008 | Pilskalns et al. | 705/10 |
| 2008/0208956 A1 | 8/2008 | Spiridellis et al. | |
| 2008/0215994 A1 | 9/2008 | Harrison et al. | |
| 2008/0221846 A1 | 9/2008 | Aggarwal et al. | |
| 2008/0229424 A1 | 9/2008 | Harris et al. | |
| 2008/0231630 A1 | 9/2008 | Shenkar et al. | |
| 2008/0243667 A1 | 10/2008 | Lecomte | |
| 2008/0263460 A1 | 10/2008 | Altberg et al. | |
| 2008/0288277 A1 | 11/2008 | Fasciano | |
| 2008/0294678 A1 | 11/2008 | Gorman et al. | |
| 2008/0300979 A1 | 12/2008 | Abhyanker | |
| 2008/0307053 A1* | 12/2008 | Mitnick et al. | 709/205 |
| 2008/0307066 A1 | 12/2008 | Amidon et al. | |
| 2008/0307320 A1 | 12/2008 | Payne et al. | |
| 2008/0316021 A1* | 12/2008 | Manz et al. | 340/539.13 |
| 2009/0003265 A1 | 1/2009 | Agarwal et al. | |
| 2009/0006177 A1 | 1/2009 | Beaver et al. | |
| 2009/0006473 A1* | 1/2009 | Elliott et al. | 707/104.1 |
| 2009/0007195 A1 | 1/2009 | Beyabani | |
| 2009/0029672 A1* | 1/2009 | Manz | 455/404.2 |
| 2009/0030927 A1 | 1/2009 | Cases et al. | |
| 2009/0031006 A1 | 1/2009 | Johnson | |
| 2009/0031245 A1 | 1/2009 | Brezina et al. | |
| 2009/0044254 A1 | 2/2009 | Tian | |
| 2009/0063500 A1 | 3/2009 | Zhai et al. | |
| 2009/0254971 A1 | 10/2009 | Herz et al. | |
| 2009/0284530 A1 | 11/2009 | Lester et al. | |
| 2010/0024045 A1 | 1/2010 | Sastry et al. | |
| 2010/0118025 A1* | 5/2010 | Smith et al. | 345/418 |
| 2010/0198684 A1* | 8/2010 | Eraker et al. | 705/14.49 |
| 2011/0093340 A1 | 4/2011 | Kramer et al. | |

OTHER PUBLICATIONS

Jones et al., People-To-People-To-Geographical Places: The P3 Framework for Location Based Community Systems, p. 24-282 (Computer Supported Cooperative Work vol. 13, Kluwer Academic Publishers, 2004).*

Mehler et al., Spatial Anaysis of News Sources, p. 765-771 (IEEE Transactions on Visualization and Computer Graphics, vol. 12, No. 5., IEEE, Sep./Oct. 2006).*

* cited by examiner

| USER 500 | PROXIMITY 502 | PRINCIPAL ADDRESS 504 | E-MAIL 506 | PUBLICATION TYPE 508 | INSTANT MESSAGE 510 | CONTACT NUMBER 512 |
|---|---|---|---|---|---|---|
| JOHN SMITH | SAME STREET | 222 TULANE RD. | J.SMITH@MOO.COM | VIDEO CLIP | N/A | N/A |
| BILL HARRIS | 1 MILE | 643 SUNRISE DR. | BILLTHEKID@ASH.COM | BANTER | BILL HARRIS | 926-743-8527 |
| VICTOR DRAZEN | NEXT DOOR | 386 TULANE RD. | 24DRAZEN@FOXX.COM | BANTER | VD24 | 926-743-1126 |
| CHLOE O'HARE | ¼ MILE | 99 HAMI AVE. | SIRROM@CTU.EDU | AUDIO | N/A | N/A |
| STEVE LOWRY | ½ MILE | 64 CANYON CT. | STEVE@CBA.COM | PHOTO | N/A | N/A |
| ... | ... | ... | ... | ... | ... | ... |

PRIVATE NEIGHBORHOOD SOCIAL NETWORK, SYSTEMS, AND METHODS

CLAIMS OF PRIORITY

This patent application is a full Continuation patent application of:
(1) U.S. utility patent application Ser. No. 11/827,400 titled 'HOT NEWS NEIGHBORHOOD BANTER IN A GEO-SPATIAL SOCIAL NETWORK' filed on Jul. 10, 2007.

FIELD OF TECHNOLOGY

This disclosure relates generally to the technical fields of communications and, in one example embodiment, to a method and system of hot news neighborhood banter in a geo-spatial social network.

BACKGROUND

A news story may be any information (e.g., discovery of a new element in periodic table, development in an important Supreme Court case, final score of Super Bowl, etc.) and/or current events (e.g., War in Iraq, March Madness, presidential elections, etc.). The news story may often be reported by a variety of sources (e.g., newspapers, television, radio programs, wire service, websites, etc.). A news reporter may investigate the news story and/or may try to cover at least one side of an issue.

The news reporter may contact a person close to the news story (e.g., eye witness, neighbor, etc.) to obtain information (e.g., eye-witness account, photos, videos, audio files, etc.) relevant to the news story. The news reporter may perceive the information differently than the person contacted and/or choose not to use it in the news story.

An interested party in the news story may want more information about the news story. The person close to the news story (e.g., a neighbor) may have information (e.g., comments, personal thoughts, video clips, etc.) regarding the news story, but may not be able to share this information with the interested party. The person may submit the information through internet and/or network technologies (e.g., web logs, chat rooms, message boards, etc.). However, the interested party may not be able to easily find this submitted information.

The news reporter (e.g., journalist, radio broadcaster, television anchorman, etc.) may not know whom to interview to obtain information relevant to the news story. The news reporter may be far from the location of the news story and/or may be unable to reach the location fast enough (e.g., traffic blocking the road, the location is too far away, the area is blocked off, etc.). Hence, the news reporter may not be able to contact people close to the news story (e.g., neighbors, eye witnesses, etc.)

SUMMARY

A method and system of hot news neighborhood banter in a geo-spatial social network are disclosed. In one aspect, a method of providing users with timely information about a news story related to geographic locations of the users, the method includes receiving a submission of a news story from the Internet via a computer network interface device, the news story comprising a geographic location of the news story, a description of the details of the news story and information related to the description of items associated with the news story, searching a contact database, the contact database stored on a computer and comprising electronic contact information and geographic location information of a plurality of users, to select users whose geographic locations indicate a proximity to the geographic location of the news story, providing, via the computer network interface device, the selected users with the geographic location of the news story, the description of the details of the news story, and the information related to the description of an item associated with the news story, enabling an interested user to form an immediate communication in the form of an online interview with at least one of a neighboring user surrounding the specific geographic location of the news story, generating a contact information of users, wherein the contact information comprises at least one of an electronic communication address and a telephonic contact number, and permitting other users to access the contact information of the user when the user makes a in order to permit immediate communication between at least the other user and the submitter user.

The methods, systems, and apparatuses disclosed herein may be implemented in any means for achieving various aspects, and may be executed in a form of a machine readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 5 is a table view of user contact details, according to one embodiment.

Figure 1:
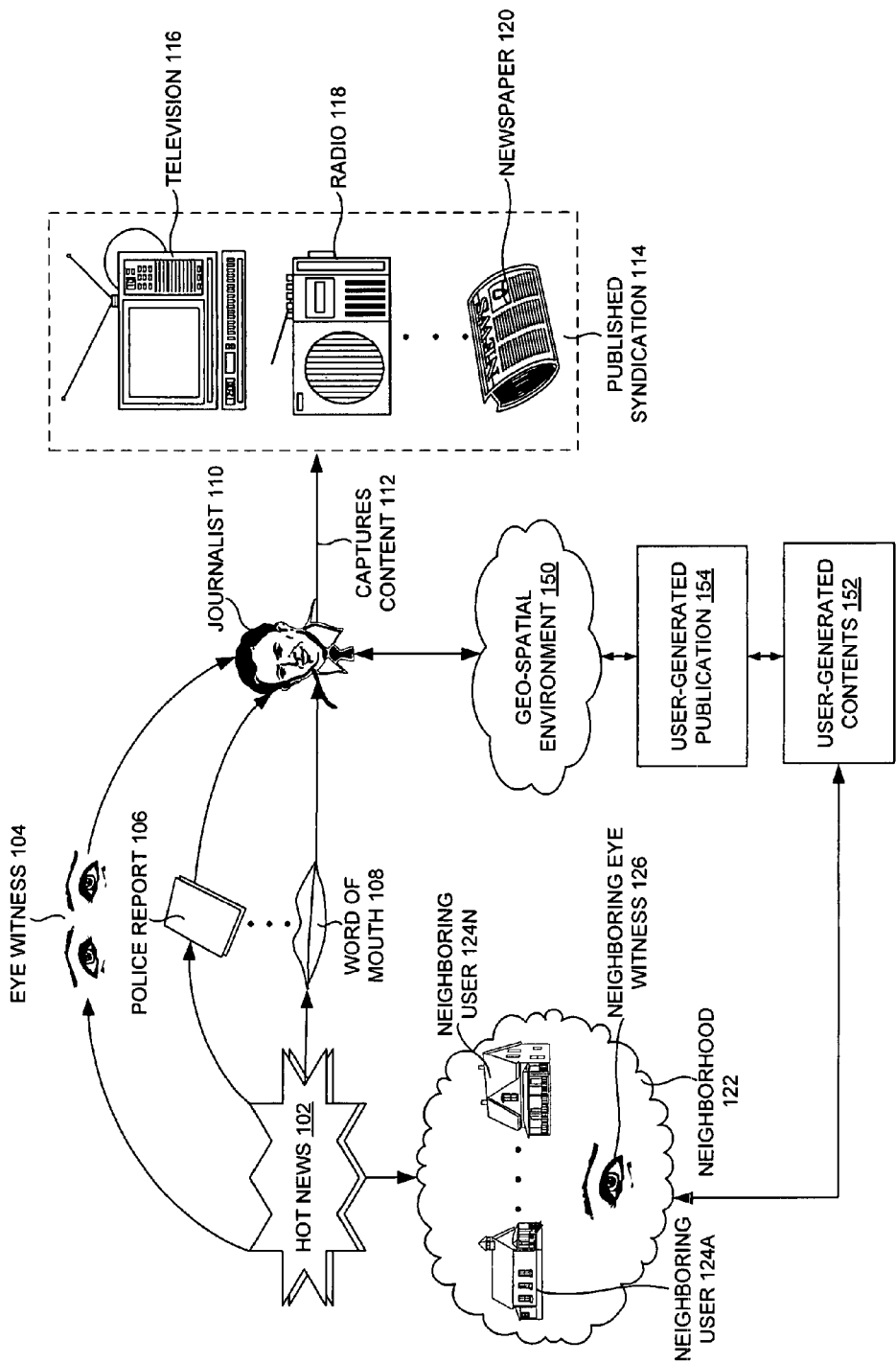
FIG. 1 is a process view of a hot news story published through a number of methods, according to one embodiment.

Other features of the present embodiments will be apparent from the accompanying drawings and from the detailed description that follows.

DETAILED DESCRIPTION

A method and system of hot news neighborhood banter in a geo-spatial social network are disclosed. In the following description, for the purposes of explanation, numerous specific details are set forth in order to provide a thorough understanding of the various embodiments. It will be evident, however to one skilled in the art that the various embodiments may be practiced without these specific details.

In one embodiment, a method includes identifying (e.g., using the news provider module 206 FIG. 2) a hot news story, (e.g., the hot news 102 of FIG. 1) associating the hot news story 102 with a specific geographic location (e.g., the hot news location 222 of FIG. 2), generating a map concurrently displaying (e.g., using the hot news module 208 of FIG. 2) a headline of the hot news story 102 and the specific geographic location 222, and simultaneously generating in the map, profiles associated with users (e.g., the neighboring users 228A-N of FIG. 2) surrounding the specific geographic location 222 associated with the hot news story 102.

In another embodiment, a method includes associating a current event (e.g., the hot news 102 of FIG. 1) with a specific geographic location (e.g., the hot news location 222 of FIG. 2), and creating a group of neighboring users (e.g., the neighboring users 228A-N of FIG. 2) surrounding the specific geographic location 222 of the current event (e.g., the hot news 102) in a geo-spatial social network (e.g., of the geo-spatial environment 150 illustrated in FIG. 1).

In yet another embodiment, a system includes a news provider module (e.g., the news provider module 206 of FIG. 2) to determine a hot news story (e.g., the hot news 102 of FIG. 1) associated with a specific geographic location (e.g., the hot news location 222 of FIG. 2) and the specific geographic location 222, a hot news module (e.g., the hot news module 208 of FIG. 2) to display the hot news story 102 associated with the specific geographic location 222 on a map, and a geo-spatial environment 150 to process user-generated contents (e.g., the user-generated contents 152 of FIG. 1) associated with the hot news story 102.

FIG. 1 is a process view of a hot news story 102 published through a number of methods, according to one embodiment. Particularly, FIG. 1 illustrates a hot news 102, an eye witness 104, a police report 106, a word of mouth 108, a journalist 110, captures content 112, a published syndication 114, a television 116, a radio 118, a news paper 120, a neighborhood 122, neighboring users 124A-N, a neighboring eyewitness 126, a geospatial environment 150, user-generated contents 152 and a user-generated publication 154, according to one embodiment.

The hot news 102 may be any new information associated with events which are relayed through print (e.g., the news paper 120 of FIG. 1), broadcast (e.g., through the television 116 of FIG. 1), internet, and/or word of mouth 108 to a third party (e.g., the public). The eye witness 104 may be a source of first-hand knowledge (e.g., acquired through senses such as seeing, hearing, touching and/or smelling) about the hot news 102. The police report 106 may be a document submitted by the neighboring users 124A-N describing the hot news 102 in the neighborhood 122. The word of mouth 108 may be passing of information associated with the hot news 102 through verbal means (e.g., spoken communication) to an interested user (e.g., the journalist 110 of FIG. 1).

The journalist 110 may be a person interested in accessing and communicating (e.g., broadcasting through the television 116 and the radio 118, and/or publishing through the news paper 120) the hot news 102 in the neighborhood 122. The captures content 112 may be a process of syndicating the information associated with the hot news 102 acquired from the eye witness 104, the police report 106 and/or the word of mouth 108. The neighborhood 122 may correspond to a localized community which includes a specific geographic location (e.g., the hot news location 222 of FIG. 2) associated with the hot news 102 and the neighboring users 124A-N.

The neighboring users 124A-N may be individuals surrounding (e.g., living close to) the hot news location 222. The neighboring eyewitness 126 may be an entity having the first hand knowledge associated with the hot news 102. The geo-spatial environment 150 may process the user-generated contents 152 associated with the hot news 102. The user-generated contents 152 may be content provided by the neighboring users 124A-N surrounding the hot news 102 to the geo-spatial environment 150. The user-generated publication 154 may be a published form of the user-generated contents 152 submitted by the neighboring users 124A-N associated with the hot news 102 in the geo-spatial environment 150.

In the example embodiment illustrated in FIG. 1, the neighboring users 124A-N may be individuals located. in a vicinity of the hot news location 222. The journalist 110 may access information associated with the hot news 102 directly from the neighboring users 124A-N, who have some information about the hot news 102. The journalist 110 may collect the information regarding the hot news 102 through multiple sources such as the eye witness 104, the police report 106 and/or the word of mouth 108. The journalist 110 may publish the collected information in the television 116, the radio 118 and/or news paper 120 as illustrated.

In another example embodiment illustrated in FIG. 1, the journalist 110 may access the information related to the hot news 102 uploaded by the neighboring users 124A-N through the geo-spatial environment 150. The geo-spatial environment 150 may enable the neighboring users 124A-N to submit the user-generated contents 152 in the geo-spatial environment 150. The journalist 110 may access the user-generated contents 152 through the user-generated publication 154 submitted to the geo-spatial environment 150. The geo-spatial environment 150 may enable communication between the neighboring users 124A-N surrounding the hot news location 222 and the journalist 110 who is interested in hot news 102. The journalist 110 may communicate with the neighboring users 124A-N regarding the hot news 102 through the geo-spatial environment 150. The journalist 110 may capture (e.g., store, record, track, etc.) information associated with the hot news 102 and/or syndicate the information in the television 116, the radio 118 and/or the news paper 120.

Figure 2:
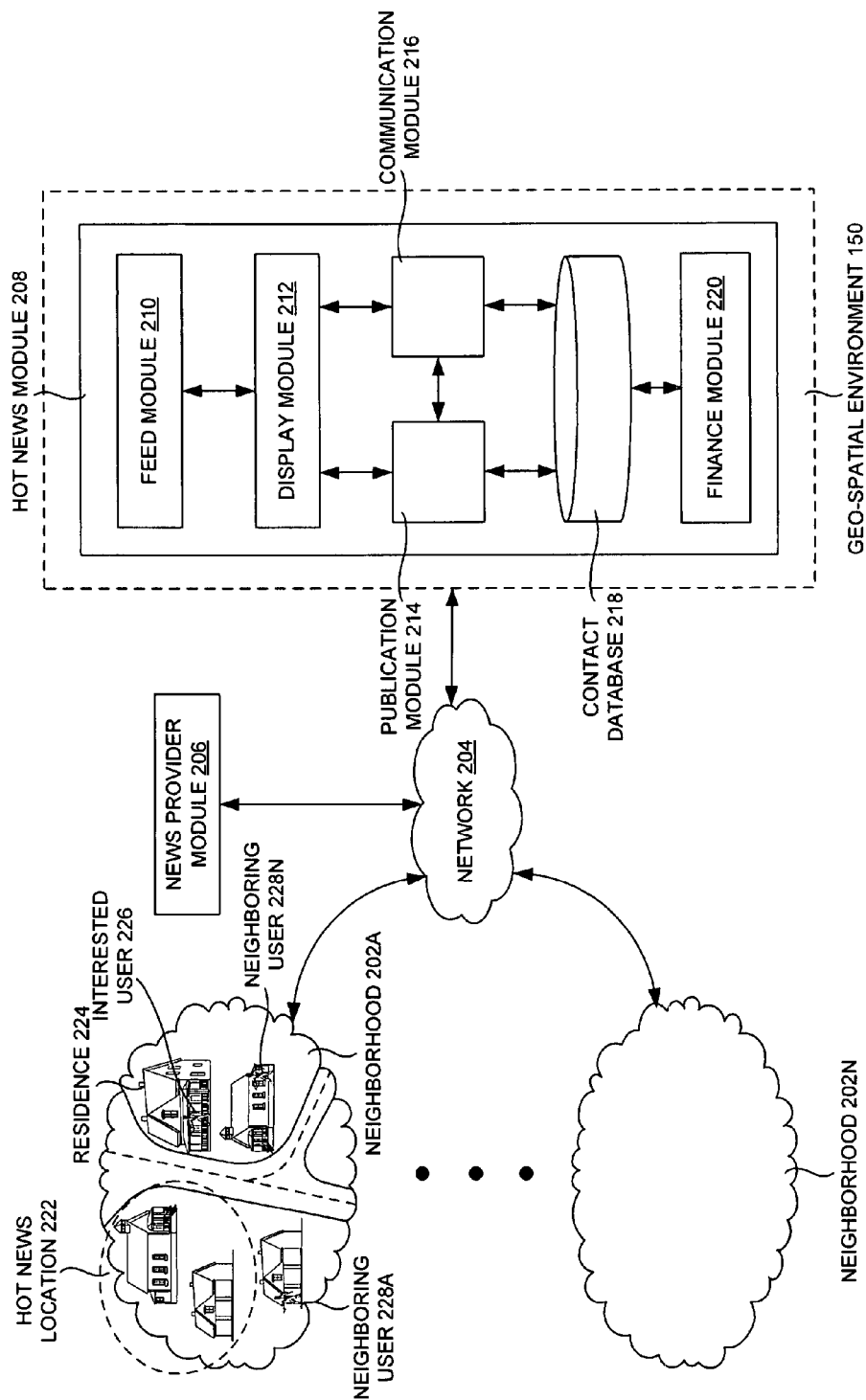
FIG. 2 is a system view of a geo-spatial environment communicating with neighborhood(s) of hot news locations through a network, according to one embodiment.

FIG. 2 is a system view of the geo-spatial environment 150 communicating with neighborhoods 202A-N of a hot news location 222 through a network 204, according to one embodiment. Particularly, FIG. 2 illustrates the geo-spatial environment 150, the neighborhoods 202A-N, the network 204, a news provider module 206, a hot news module 208, a feed module 210, a display module 212, a publication module 214, a communication module 216, a contact database 218, a finance module 220, the hot news location 222, a residence 224, an interested user 226 and neighboring users 228A-N, according to one embodiment.

The geo-spatial environment 150 may process a submission form associated with the hot news story (e.g., the hot news 102 of FIG. 1), submitted by the neighboring users 228A-N. For example, the submission form may include an audio file, a video file, a photo, an article, and/or a comment, related to the hot news story 102. The geo-spatial environment 150 may also enable the interested user 226 (e.g., the journalist 110 of FIG. 1) to access user-generated contents (e.g., the user-generated contents 152 of FIG. 1) associated with hot news story 102 having the hot news location 222 through the network 204. The neighborhoods 202A-N may correspond to a geographical region associated with the hot news location 222.

The neighborhoods 202A-N may include the interested user 226, the neighboring users 228A-N, the residence 224, businesses, organizations, etc. The network 204 may facilitate communication between the geo-spatial environment 150 and users (e.g., the neighboring users 228A-N and the interested user 226 of FIG. 2) of the neighborhoods 202A-N of the hot news location 222. The news provider module 206 may determine the hot news story 102 associated with the hot news location 222. For example, the news provider module 206 may display the hot news location 222 on a geo-spatial map (e.g., the geo-spatial map 620 of FIG. 6) using a news database (e.g., the news database 310 of FIG. 3).

The hot news module 208 may concomitantly display a headline of the hot news story 102 and the hot news location 222 associated with the hot news story 102 on the geo-spatial map 620. The feed module 210 may enable the neighboring users 228A-N to submit contents (e.g., title, location, audio file, video file, etc.) associated with the hot news story 102 having the hot news location 222 to the geo-spatial social network. The display module 212 may display the user-generated contents 152 associated with the hot news story 102 submitted by the neighboring users 228A-N on the geo-spatial map 620. The publication module 214 may syndicate the user-generated contents 152 of a submission form in a published media (e.g., the television, the radio, and/or the news paper).

The communication module 216 may process correspondences (e.g., email, communication, post, letters, IM, etc.) between the neighboring users 228A-N and the interested user 226 regarding the hot news story 102 in the geo-spatial environment 150. The contact database 218 may consist of contact details (e.g., user name, principal address, e-mail, contact telephone number, etc.) of neighboring users 228A-N in the geospatial environment 150. The finance module 220 may process a fee based transaction associated with accessing the user-generated contents 152 of the hot news story 102, for immediate communication with the neighboring users 228A-N, and/or marketing the user-generated contents 152 of the neighboring users 228A-N. The finance module 220 may distribute revenue amount among the neighboring users 228A-N and the geo-spatial social network.

The hot news location 222 may be a specific geographic location associated with the hot news story 102 in the neighborhoods 202A-N. The residence 224 may be a physical location (e.g., home, residential apartment, etc.) associated with the interested user 226 in the neighborhoods 202A-N. The interested user 226 may be an individual (e.g., journalist, police, reporter, etc.) who wishes to access the user-generated contents 152 published in the geo-spatial environment 150. The neighboring users 228A-N may be users residing in close proximity of the hot news location 222 associated with the hot news story 102.

In the example embodiment illustrated in FIG. 2, the geo-spatial environment 150 communicates with the neighborhoods 202A-N and the news provider module 206 through the network 204. The neighborhoods 202A-N consists of the residence 224 associated with the interested user 226, the neighboring users 228A-N, and the hot news location 222. The interested user 226 may communicate with the neighboring users 228A-N regarding the hot news story 102 through the network 204 using the geo-spatial environment 150. The interested user 226 may communicate with the neighboring users 228A-N using messages, instant messages, emails, voice calls, etc. The geo-spatial environment 150 includes the hot news module 208 which consists of the feed module 210, the display module 212, the publication module 214, the communication module 216, the contact database 218, and the finance module 220 interacting with each other.

A hot news story (e.g., the hot news 102 of FIG. 1) may be identified (e.g., using the news provider module 206 of FIG. 2). The hot news story 102 may be associated with a specific geographic location (e.g., the hot news location 222 of FIG. 2). A map (e.g., the geo-spatial map 620 of FIG. 6) concurrently displaying a headline of the hot news story 102 and the specific geographic location 222 may be generated (e.g., using the hot news module 208 of FIG. 2). Profiles associated with the neighboring users 228A-N surrounding the specific geographic location 222 associated with the hot news story 102 may be simultaneously displayed in the map.

The interested user 226 may be enabled to access user-generated contents 152 of submission form associated with the hot news story 102. A comment from the interested user 226, relating to the user-generated contents 152 of the submission form may be submitted. Contact information of the neighboring users 228A-N, located the threshold distance away from the specific geographic location 222 of the hot news story 102 may be generated (e.g., using the contact database 218 of FIG. 2-4).

A classified view of purchasable items may be generated when the neighboring users 228A-N markets goods associated with the hot news story 102. The users (e.g., the users 400 of FIG. 4) may be notified (e.g., using the hot news module 208 of FIG. 2) that the submission form associated with the hot news story 102 has been submitted. A current event (e.g., the hot news 102 of FIG. 1) may be associated with a specific geographic location (e.g., the hot news location 222 of FIG. 2). A group including neighboring users 228A-N surrounding the specific geographic location 222 of the current event (e.g., the hot news 102) may be created in a geo-spatial social network.

The news provider module 206 may determine the hot news story 102 and the specific geographic location 222 associated with the hot news story 102. The hot news module 208 may display the hot news story 102 associated with the specific geographic location 222 on a map (e.g., the geo-spatial map 620 of FIG. 6). The geo-spatial environment 150 may process the user-generated contents 152 associated with the hot news story 102. The communication module 216 may process correspondences between the neighboring users 228A-N and other users (e.g., the interested user 226 of FIG. 2 and/or the users 400 of FIG. 4) regarding the hot news story 102. The finance module 220 may allocate and distribute compensation from an interested user 226 (e.g., the reader user 400B, the journalist user 400C, and the reporter user 400N of FIG. 4) for accessing the user-generated contents 152 associated with the hot news story 102 and/or an immediate communication with the neighboring users 228A-N.

Figure 3:
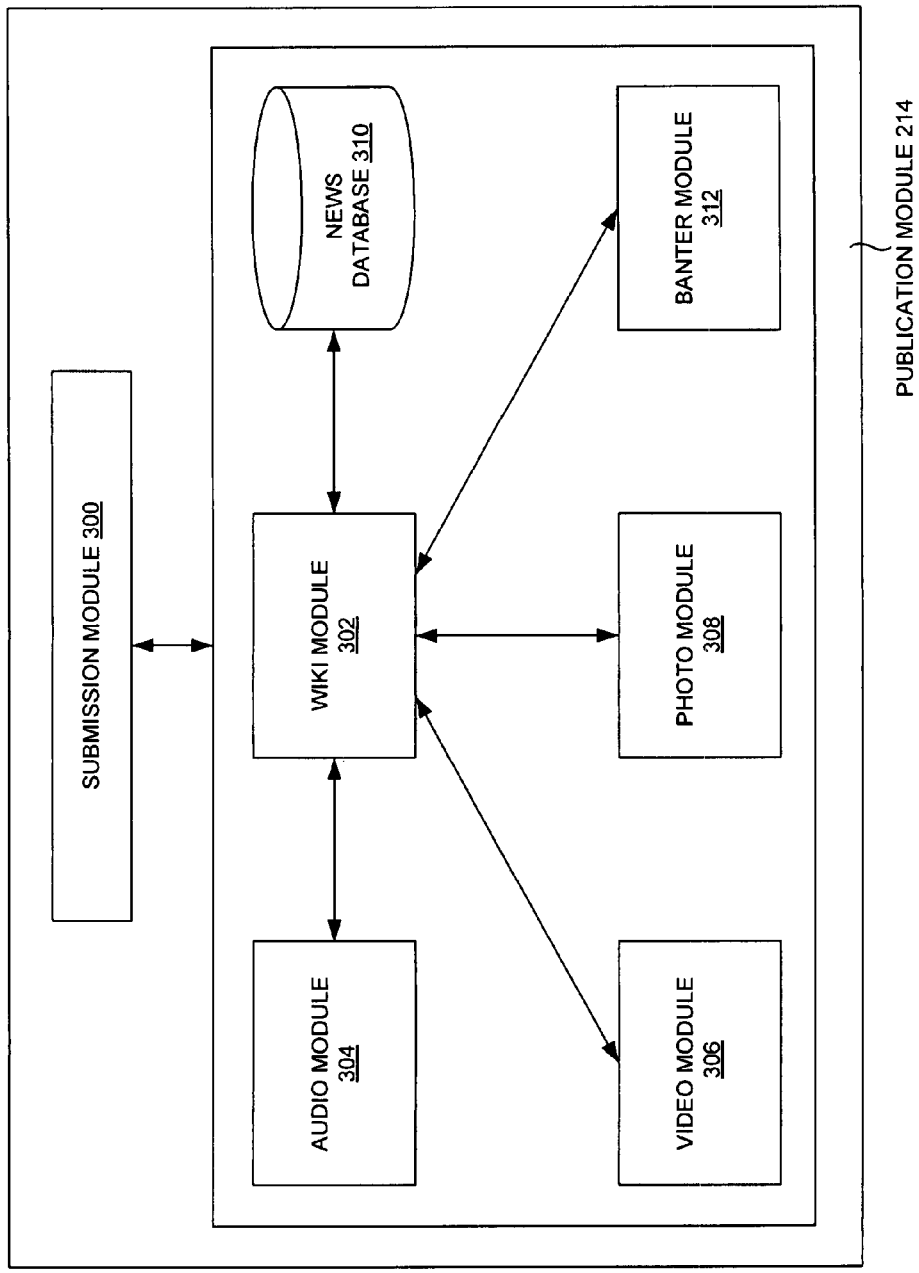
FIG. 3 is an exploded view of the publication module of FIG. 2, according to one embodiment.

FIG. 3 is an exploded view of the publication module 214 of FIG. 2, according to one embodiment. Particularly, FIG. 3 illustrates a submission module 300, a wiki module 302, an audio module 304, a video module 306, a photo module 308, a news database 310 and a banter module 312, according to one embodiment.

The submission module 300 may compile the user-generated contents 152 (e.g., audio file, video file, photo, comment, etc.) of a submission form associated with the hot news story 102 provided by the neighboring users 228A-N to the geo-spatial social network. The wiki module 302 may enable users (e.g., the interested user 226) to create and/or edit a wiki information on any event (e.g., the hot news story 102 of FIG. 1) associated with a specific geographic location (e.g., the hot news location 222 of FIG. 2).

The audio module 304 may process audio files of the submission form associated with the hot news story 102. The video module 306 may enable uploading and/or retrieving of information relating to video files of the submission form associated with the hot news story 102. The photo module 308 may process photographic images of the submission form associated with the hot news story 102. The news database 310 may contain the user-generated contents 152 (e.g., audio files, video files, and/or photos) and specific geographic locations (e.g., the hot news location 222 of FIG. 2) associated with hot news story 102 in the geo-spatial environment 150. The banter module 312 may generate a chat room in which, the neighboring users 228A-N surrounding the hot news location 222 communicate with each other regarding the hot news story 102 in the geospatial environment 150.

In the example embodiment illustrated in the FIG. 3, the submission module 300 communicates with the wiki module 302, the audio module 304, the video module 306, the photo module 308, the news database 310 and the banter module 312 interacting with each other.

A submission form (e.g., having audio file, video file, photo, and/or comment) associated with the hot news story 102, of a neighboring users 228A-N located a threshold distance away from the specific geographic location 222 of the hot news story 102 may be processed (e.g., using the submission module 300 of FIG. 3). The user generated contents 152 of the submission form may be syndicated (e.g., using the publication module 214 of FIG. 2) in a published media.

A chat room may be generated (e.g., using the banter module 312 of FIG. 3) such that the neighboring users 228A-N in the group may communicate with each other. The submission module 300 may compile the user-generated contents 152 associated with the hot news story 102 from the neighboring users 228A-N surrounding the specific geographic location 222 of the hot news story 102.

Figure 4:
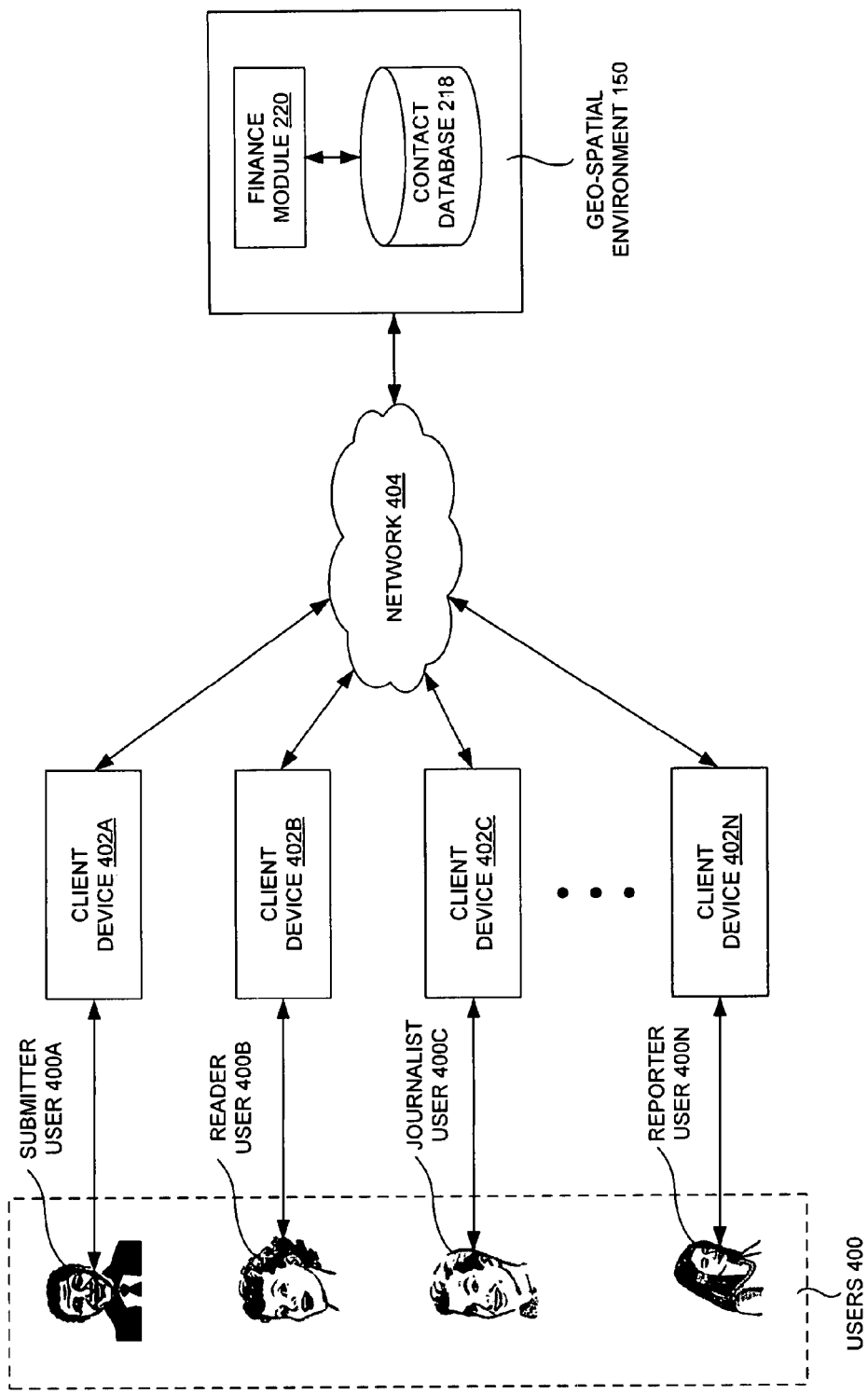
FIG. 4 is system view of the geo-spatial environment communicating with client devices through a network, according to one embodiment.

FIG. 4 is a system view of the geo-spatial environment 150 communicating with client devices 402A-N through a network 404 (e.g., the internet), according to one embodiment. Particularly, FIG. 4 illustrates the geo-spatial environment 150, the contact database 218, the finance module 220, users 400, a submitter user 400A, a reader user 400B, a journalist user 400C, a reporter user 400N, the client devices 402A-N and the network 404, according to one embodiment.

The users 400 may be individuals using the geo-spatial social network for submitting, accessing and/or retrieving the user-generated contents 152 associated with the hot news story 102. The users 400 may correspond to the submitter user 400A, the reader user 400B, the journalist user 400C and/or the reporter user 400N associated with the geo-spatial social network. The client devices 402A-N may enable processing and/or retrieving of the user-generated contents 152 associated with the hot news story 102 by the users 400 using the network 404 in the geo-spatial environment 150. The network 404 may facilitate communication between the users 400 having the client devices 402AN and the geo-spatial environment 150.

In the example embodiment illustrated in FIG. 4, the users 400 communicate with the geo-spatial environment 150 through the client devices 402A-N. The geo-spatial environment 150 includes the contact database 218 and the finance module 220 communicating with each other. For example, the reader user 400B, the journalist user 400C and/or the reporter user 400N may access contact information of the submitter user 400A for immediate communication through the contact database 218 of the geo-spatial environment 150. In addition, the reader user 400B, the journalist user 400C and/or the reporter user 400N may compensate the submitter user 400A and the geo-spatial social network for the immediate communication through the finance module 220.

The neighboring users 228A-N (e.g., the submitter user 400A of FIG. 4) may be allowed (e.g., through the communication module 216 of FIG. 2) for an immediate communication through a geo-spatial social network regarding the hot news story 102. The neighboring users 228A-N may be compensated (e.g., using the finance module 220 of FIGS. 2-4) with a consideration for the immediate communication regarding the hot news story 102. A percentage of the consideration may be allocated to the geo-spatial social network (e.g., through the finance module 220 of FIG. 2).

The user-generated contents 152 of the submission form of the neighboring users 228A-N may be marketed for sale. The neighboring users 228A-N may be compensated with a consideration. A percentage of the consideration may be allocated to the geospatial social network. An interested party (e.g., the reader user 400B, the journalist user 400C and/or the reporter user 400N of FIG. 4) may be enabled to contact the group regarding the current event (e.g., the hot news 102 of FIG. 1). The interested party (e.g., the interested user 224 of FIG. 2) may compensate the geo-spatial social network for access to contact information of a group. For example, the group may include neighboring users 228A-N surrounding the hot news location 222 in the geo-spatial environment 150.

FIG. 5 is a table view of user contact details, according to one embodiment. Particularly, FIG. 5 illustrates a user field 500, a proximity field 502, a principal address field 504, an e-mail field 506, a publication type field 508, an instant message field 510 and a contact number field 512, according to one embodiment.

The user field 500 may represent names of neighboring users 228A-N who have submitted user-generated contents (e.g., the user-generated contents 152 of FIG. 1) associated with the hot news story 102 to the geo-spatial environment 150. The proximity field 502 may represent a geographic proximity between neighboring users 228A-N and the hot news location 222. The principal address field 504 may display address data associated with the neighboring users 228A-N surrounding the hot news location 222 in the geo-spatial environment 150. The e-mail field 506 displays e-mail addresses associated with the neighboring users 228A-N of the user field 500 through which the interested user 226 may communicate with the neighboring users 228A-N regarding the hot news story 102.

The publication type field 508 may display the type of the user-generated contents 152 (e.g., video, audio, photo, banter, etc.) submitted by the neighboring users 228A-N to the geo-spatial social network. The instant message field 510 may display instant messages sent by the interested user 226. The contact number field 512 may display the contact number (e.g., mobile number, land line number, etc.) associated with the neighboring users 228A-N of the user field 500.

In the example embodiment illustrated in the FIG. 5, the user field 500 displays "John Smith" in first row, "Bill Harris" in second row, "Victor Drazen" in third row, "Chloe O'Hare" in fourth row and "Steve Lowry" in fifth row of the user field column 500. The proximity field 502 displays "Same Street" in the first row which represents that John Smith is located in the same street associated with the hot news location 222. The proximity field 502 also displays "1 Mile" in the second row which indicates Bill Harris is located 1 mile away from the hot news location 222. The proximity field 502 also displays "Next Door" in the third row which indicates Victor Drazen is a next door neighbor of the hot news location 222 associated with the hot news story 102. Similarly, the proximity field 502 displays "114 Mile" in the fourth row and "112 Mile" in the fifth row of the proximity field column 502 which indicates the proximity between neighboring users (e.g., Chloe O'Hare and Steve Lowry) and the hot news location 222.

The principal address field 504 displays "222 Tulane RD." in the first row representing address data associated with John Smith, and "643 Sunrise DR." in the second row representing address data associated with Bill Harris. Similarly, the principal address field 504 also displays "386 Tulane RD." in the third row, "99 Hami AVE." in the fourth row and "64 Canyon CT." in the fifth row of the principal address field column 504. The e-mail field 506 displays an e-mail address of John Smith j.smith@moo.com in the first row, an e-mail address of Bill Harris "billthekid@ash.com" in the second row, an e-mail address of Victor Drazen "24drazen@,foxx.com" in the third row, an e-mail address of Chloe O'Hare "sirrom@ctu.edu" in the fourth row and an e-mail address of Steve Lowry "steve@cba.com" in the fifth row of the e-mail field column 506.

The publication type field 508 displays a "Video clip" associated with the hot news story 102 uploaded by John Smith in the first row, "Banter" submitted by Bill Harris in the second row, "Banter" submitted by Victor Drazen in the third row, "Audio" submitted by Chloe O'Hare in the fourth row and a "Photo" Submitted by Steve Lowry in the fifth row of the publication type field column 508.

The instant message field 510 displays "NIA" in the first row which indicates John Smith may not be available for immediate communication. The instant message field 510 also displays "Bill Harris" in the second row (e.g., the IM chat between Bill Harris and an interested user 226). The instant message field 510 also displays "VD24" in the third row (e.g., the IM chat between Victor Drazen and an interested user 226). Similarly, the instant message field 510 displays "N/A" in the fourth row and "NIA" in the fifth row of the instant message field column 510 (e.g., Chloe O'Hare and Steve Lowry are not available for communication).

The contact number field 512 displays "NIA" in the first row which indicates John Smith may not be available for telephonic conversation regarding the hot news story 102. The contact number field 512 displays "926-743-8527" in the second row which indicates Bill Harris may be available for telephonic conversation through the displayed contact number regarding the hot news story 102. Similarly, the contact number field 512 displays "926-743-1126" in the third row indication contact information of Victor Drazen, "NIA" in the fourth row and "NIA" in the fifth row of the contact number field column 512.

Figure 6:
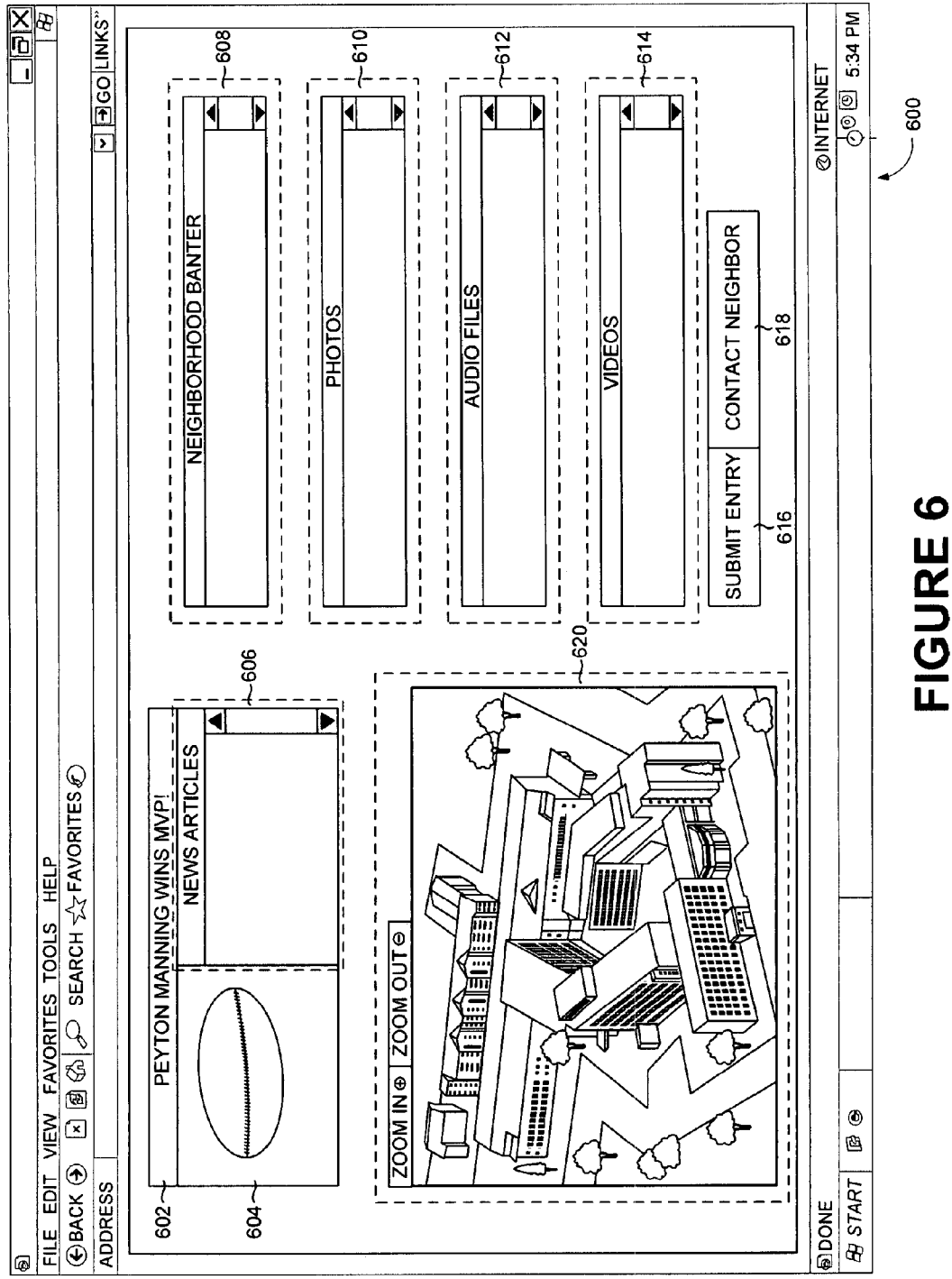
FIG. 6 is a user interface view of the display module of FIG. 2, according to one embodiment.

FIG. 6 is a user interface view 600 of the display module 212 of FIG. 2, according to one embodiment. Particularly, FIG. 6 illustrates a title block 602, a block 604, a news articles option 606, a neighborhood banter option 608, a photos option 610, an audio files option 612, a videos option 614, a submit entry option 616, a contact neighbor option 618 and a geo-spatial map 620, according to one embodiment.

The title block 602 may display a headline of a hot news story 102 on the geospatial map 620. The block 604 may display an image related to the hot news story 102 submitted by neighboring users 228A-N. The news articles option 606 may enable the interested user 226 to access articles associated with the hot news story 102. The neighborhood banter option 608 may enable the neighboring users 228A-N to submit comments associated with the hot news story 102. The photos option 610 may enable the neighboring users 228A-N to upload the photographic images associated with the hot news story 102.

The audio files option 612 may enable the neighboring users 228A-N to upload audio data (e.g., an audio file) associated with the hot news story 102. The videos option 614 may enable the neighboring users 228A-N to upload video data associated with the hot news story 102. The submit entry option 616 may enable the neighboring users 228A-N to submit user-generated contents 152 (e.g., photos, audio files, and/or videos) to the geo-spatial social network. The contact neighbor option 618 may enable the interested user 226 (e.g., the reader user 400B, the journalist user 400C and/or the reporter user 400N of FIG. 4) to contact the neighboring users 228A-N surrounding the hot news location 222 regarding the hot news story 102. The geo-spatial map 620 may display the hot news location 222 associated with the hot news story 102 in a neighborhood (e.g., the neighborhoods 202A-N of FIG. 2).

In the example embodiment illustrated in the FIG. 6, the user interface view 600 displays a headline "Peyton Manning wins MVP" associated with the hot news story 102 in the title block 602, and "an image" in the block 604 related to the hot news story 102. For example, the user interface view 600 also displays content published in magazines, newspapers, academic journals, and/or internet in the news articles option 606. The contact neighbor option 618 may enable the neighboring users 228A-N for immediate communication regarding the hot news story 102. The user interface view 600 also displays the user-generated contents 152 submitted by neighboring users 228A-N regarding the hot news story 102.

Figure 7:
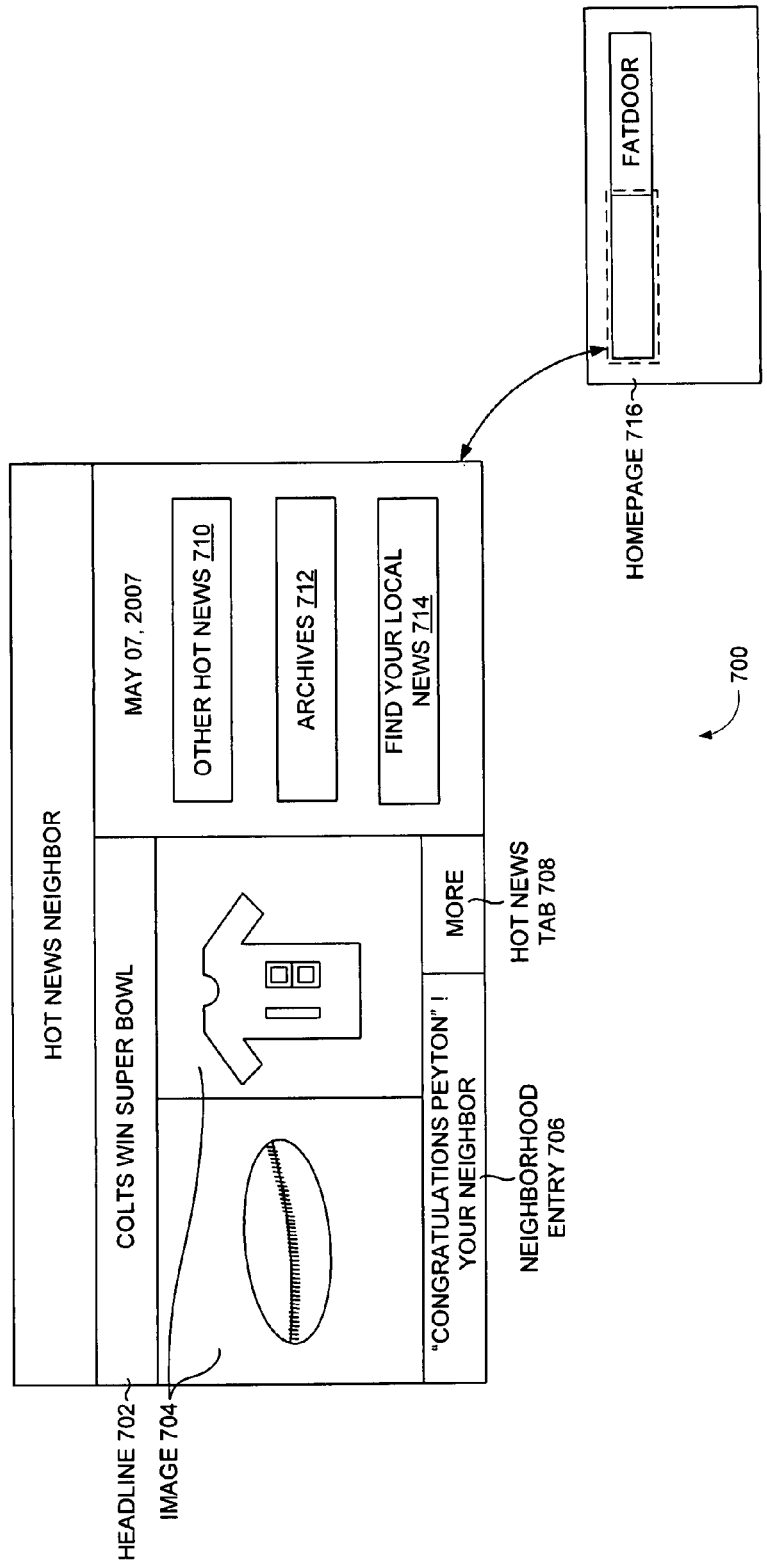
FIG. 7 is a user interface view of the banter module of FIG. 3, according to one embodiment.

FIG. 7 is a user interface view 700 of the banter module 312 of FIG. 3, according to one embodiment. Particularly, FIG. 7 illustrates a headline block 702, a block 704, a neighborhood entry option 706, a hot news tab 708, an other hot news option 710, an archives option 712, a find your local news option 714 and a homepage 716, according to one embodiment.

The headline block 702 may display a headline of a hot news story (e.g., the hot news 102 of FIG. 1) associated with a specific geographic location (e.g., the hot news location 222 of FIG. 2). The block 704 may display an image related to the hot news story 102, submitted by the neighboring users 228A-N surrounding the hot news location 222. The neighborhood entry option 706 may enable the interested user 226 to communicate with the neighboring users 228A-N surrounding the hot news location 222 regarding the hot news story 102. The hot news tab 708 may enable the interested user 226 to access user-generated contents (e.g., the user-generated contents 152 of FIG. 1) associated with the hot news story 102.

The other hot news option 710 may enable the interested user 226 to access the user-generated contents 152 of other news in the geo-spatial environment 150. The archives option 712 may contain archived records associated with a number of hot news stories. The find your local news option 714 may enable the interested user 226 to view news associated with a particular region (e.g., street, city, country, etc.). For example, the interested user 226 may access the find your local news option 714 to view latest news around his/her neighborhood (e.g., the neighborhoods 202A-N of FIG. 2) area through the geo-spatial social network. The homepage 716 may enable the interested user 226 to search one or more hot news stories through the geo-spatial social network.

In the example embodiment illustrated in the FIG. 7, the user interface view displays the headline "Colts win super bowl" associated with the hot news story 102. The neighborhood entry option 706 displays "Congratulations Peyton, your neighbor" conveying a congratulating message to Peyton by his neighbor. The block 704 displays photographs of "Rugby Ball" and "Player Jersey" associated with the hot news story 102. The user may enable to search for the user-generated contents 152 through the homepage 716 using the geo-spatial social network.

Figure 8:
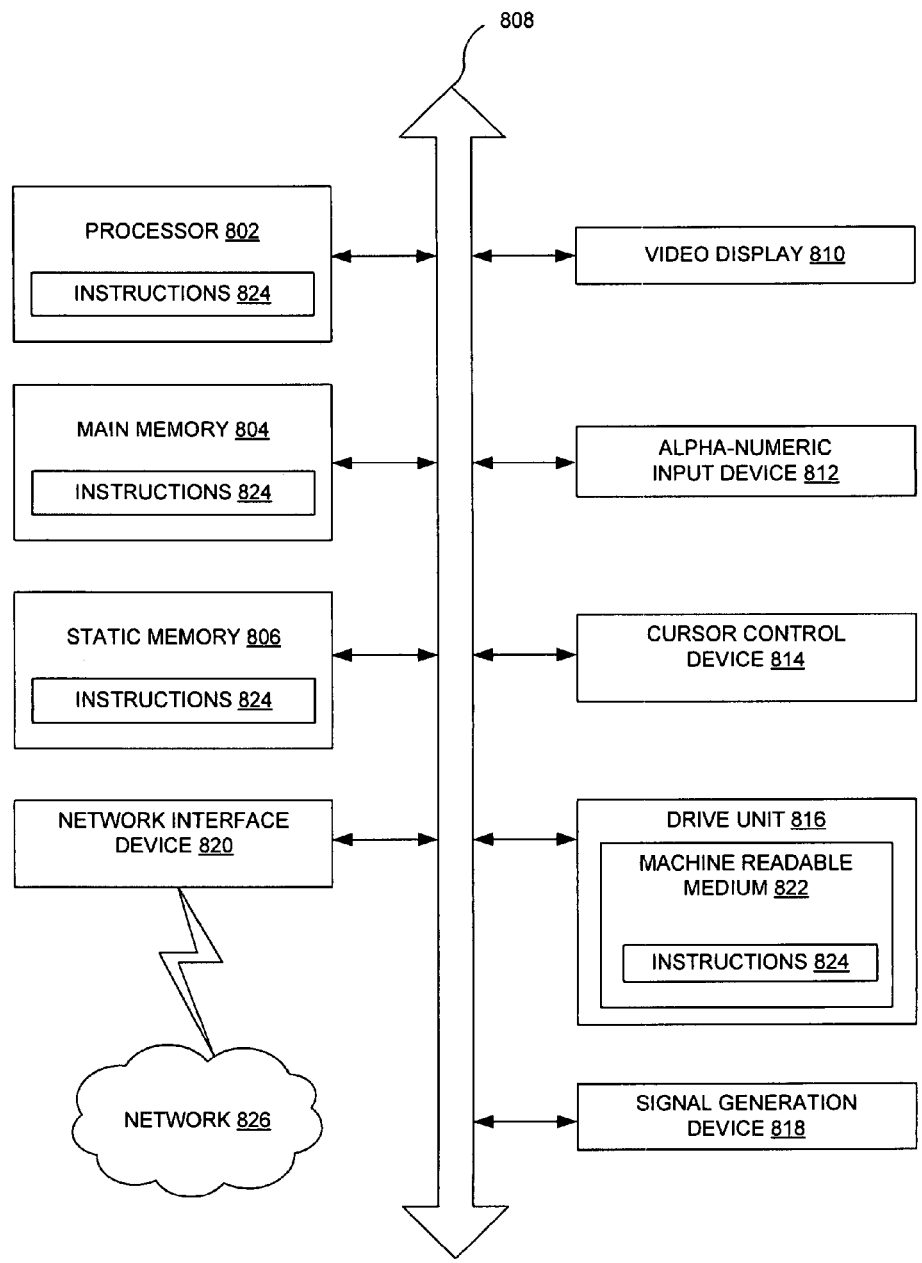
FIG. 8 is a diagrammatic system view of a data processing system in which any of the embodiments disclosed herein may be performed, according to one embodiment.

FIG. 8 is a diagrammatic system view 800 of a data processing system in which any of the embodiments disclosed herein may be performed, according to one embodiment. Particularly, the diagrammatic system view 800 of FIG. 8 illustrates a processor 802, a main memory 804, a static memory 806, a bus 808, a video display 810, an alpha-numeric input device 812, a cursor control device 814, a drive unit 816, a signal generation device 818, a network interface device 820, a machine readable medium 822, instructions 824 and a network 826, according to one embodiment.

The diagrammatic system view 800 may indicate a personal computer and/or a data processing system in which one or more operations disclosed herein are performed. The processor 802 may be microprocessor, state machine, an application specific integrated circuit, a field programmable gate array, etc. (e.g., Intel Pentium processor). The main memory 804 may be a dynamic random access memory and/or a primary memory of a computer system.

The static memory 806 may be a hard drive, a flash drive, and/or other memory information associated with the data processing system. The bus 808 may be an interconnection between various circuits and/or structures of the data processing system. The video display 810 may provide graphical representation of information on the data processing system. The alpha-numeric input device 812 may be a keypad, keyboard and/or any other input device of text (e.g., special device to aid the physically handicapped). The cursor control device 814 may be a pointing device such as a mouse.

The drive unit 816 may be a hard drive, a storage system, and/or other longer term storage subsystem. The signal generation device 818 may be a bios and/or a functional operating system of the data processing system. The network interface device 820 may be a device that may perform interface functions such as code conversion, protocol conversion and/or buffering required for communication to and from a network. The machine readable medium 822 may provide instructions on which any of the methods disclosed herein may be performed. The instructions 824 may provide source code and/or data code to the processor 802 to enable any one/or more operations disclosed herein.

Figure 9:
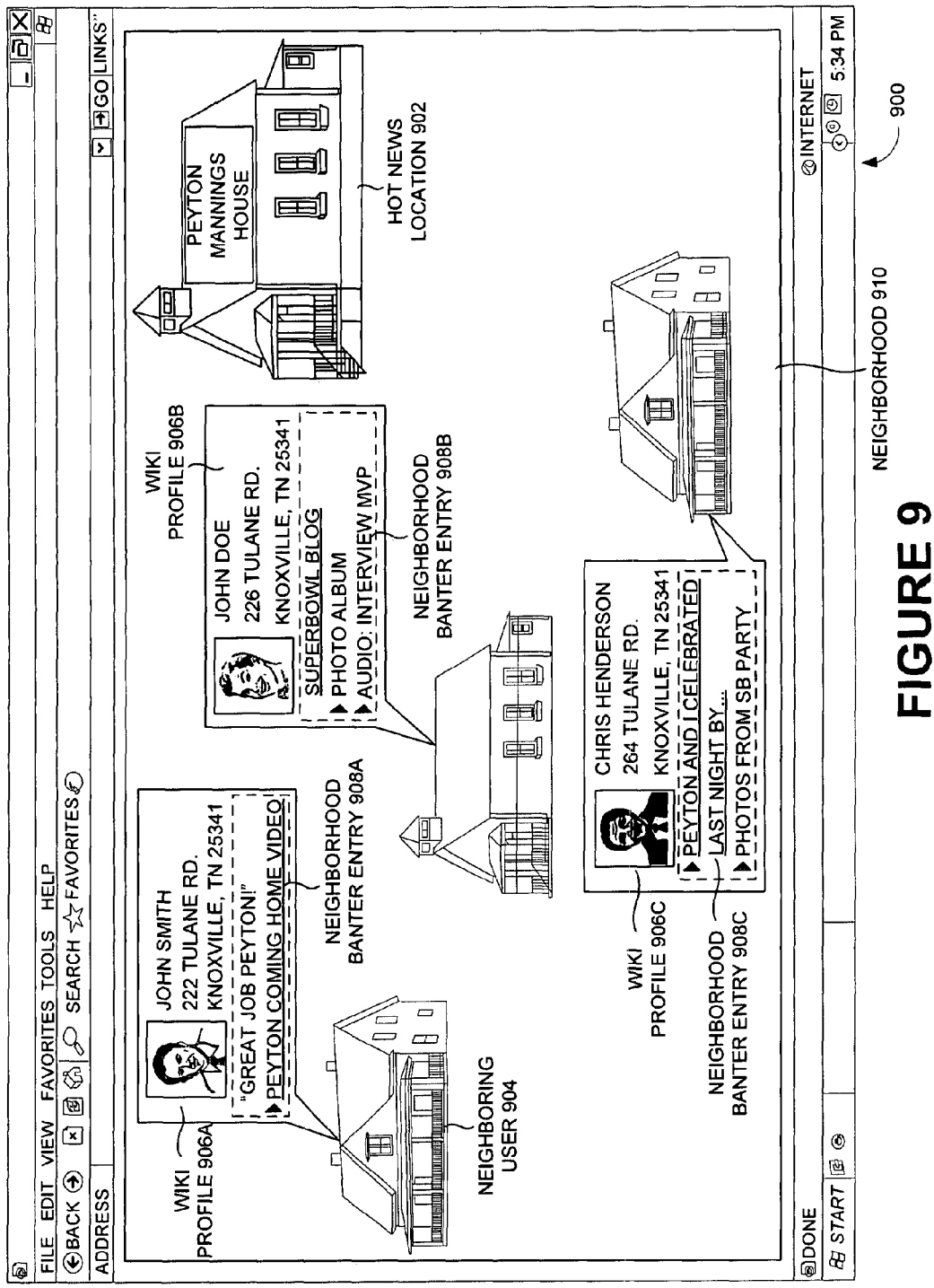
FIG. 9 is a user interface view of a hot news map illustrating neighborhood banter, according to one embodiment.

FIG. 9 is a user interface view 900 of a hot news map illustrating neighborhood banter, according to one embodiment. Particularly, FIG. 9 illustrates a hot news location 902, neighboring users 904A-C, wiki profiles 906A-C, a neighborhood banter entry link 908A-C and a neighborhood 910, according to one embodiment.

The hot news location 902 may represent a specific geographic location associated with a hot news story (e.g., the hot news 102 of FIG. 1) in the geo-spatial environment 150. The neighboring users 904A-C may be individuals surrounding (e.g., located in the vicinity of) the hot news location 902. The wiki profiles 906A-C may be profiles associated with the neighboring users 904A-C surrounding the hot news location 902. For example, the wiki profiles 906A-C may be created by the users (e.g., the users 400 of FIG. 4) of the geo-spatial social network. The neighborhood banter entry link 908A-C may enable the interested user (e.g., the reader user 400B, the journalist user 400C, and/or the reporter user 400N of FIG. 4) to access contents (e.g., video file, audio file, news articles, etc.) submitted by the neighboring users 904A-C regarding the hot news story 102.

The neighborhood banter entry link 908A-C may also enable the neighboring users 904A-C to market goods (e.g., autographed football of a football player, goods related to a crime, monuments, etc.) associated with hot news story 102 of the hot news location 902. The neighborhood 910 may be a geographically localized community which includes the hot news location 902, the neighboring users 904A-C surrounding the hot news location 902, located within a larger city, town and/or suburb.

In the example embodiment illustrated in FIG. 9, the user interface view 900 of the hot news map displays the wiki profile(s) 906A-C associated with the neighboring users 904A-C surrounding the hot news location 902 (e.g., Peyton Manning's house) in the hot news map. The wiki profile(s) 906A-C displays profile information (e.g., name, photo, address, etc.) of the neighboring users 904A-C and user-generated content (e.g., video files, audio files, articles, blogs, etc.) related to the hot news story 102. The neighborhood banter entry link 908A-C displayed in the hot news map may enable the neighboring users 904A-C (e.g., John Smith, John Doe, Chris Henderson associated with the wiki profile(s) 906A-C) to communicate (e.g., using email, IM, SMS, mobile, etc.) with each other regarding the hot news story 102 associated with the hot news location 902.

Figure 10:
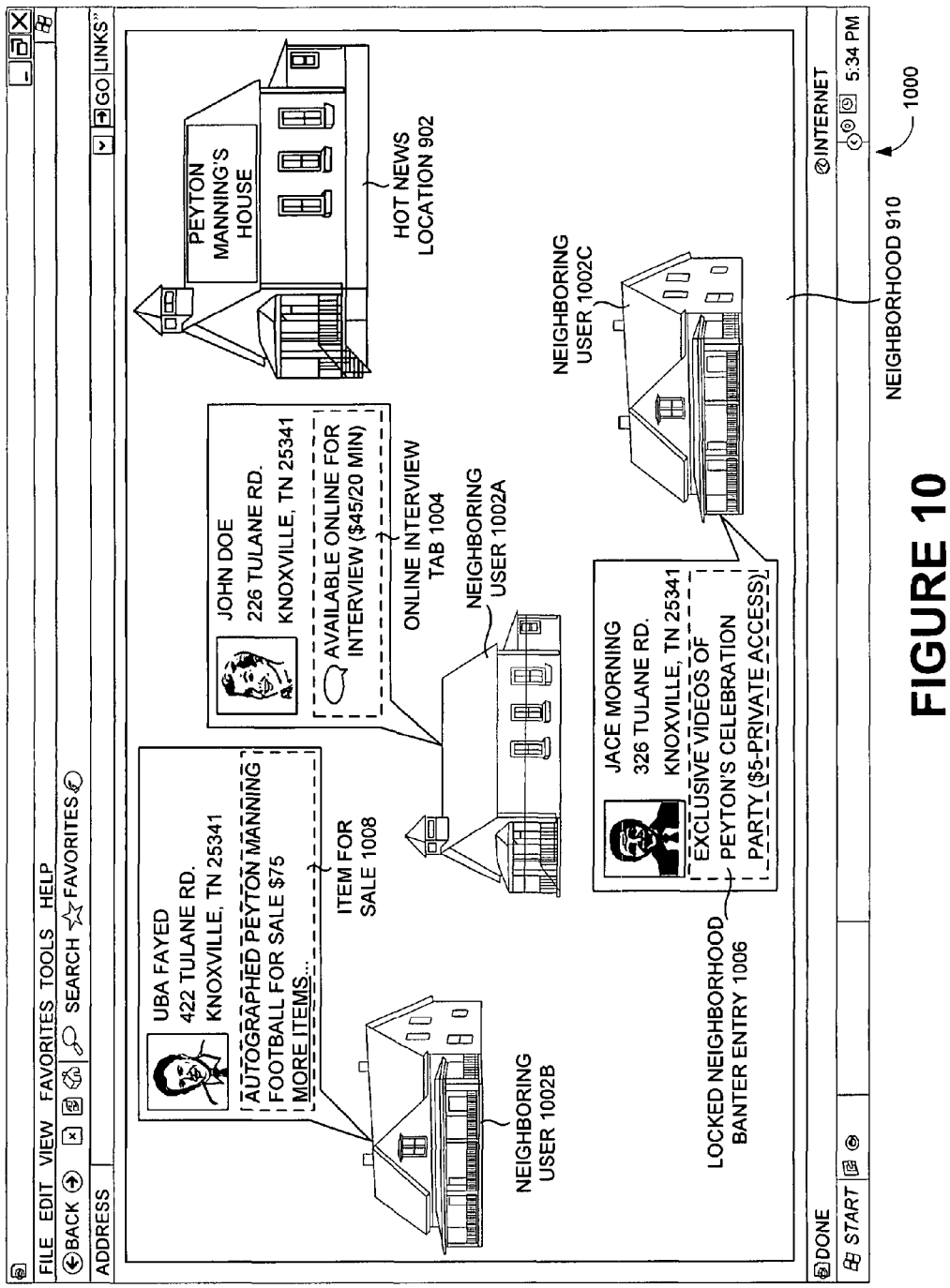
FIG. 10 is a user interface view of a hot news map illustrating neighborhood collectibles for sale, according to one embodiment.

FIG. 10 is a user interface view 1000 of a hot news map illustrating neighborhood collectibles for sale, according to one embodiment. Particularly, FIG. 10 illustrates a hot news location 902, the neighborhood 910, neighboring users 1002A-C, an online interview tab 1004, a locked neighborhood banter entry 1006 and an item for sale 1008, according to one embodiment.

The hot news location 902 may be a specific geographic location (e.g., Peyton Manning's house) associated with a hot news story 102 in the geo-spatial environment 150. The neighboring user(s) 1002A-C may be individuals residing a threshold distance away from the hot news location 902 in the neighborhood 910. The online interview tab 1004 may enable the neighboring user 1002A for an immediate communication through the geo-spatial social network. The online interview tab 1004 may display information that the neighboring user 1002A is available for online interview regarding the hot news story 102. The locked neighborhood banter entry 1006 may display locked contents associated with the neighborhood banter of the neighboring user 1002C. The item for sale 1008 may display goods that the neighboring user 1002B wishes to sell.

In the example embodiment illustrated in FIG. 10, the user interface view 1000 of the hot news map displays the hot news location 902 associated with the hot news story 102. The online interview tab 1004 displays "available online for interview ($45/20 min)" associated with the neighboring user 1002A (e.g., John Doe). The locked neighborhood banter entry 1006 displays the locked user-generated content "exclusive videos of Peyton's celebration party". The items for sale 1008 displays item "autographed Peyton Manning football for sale $75" associated with the neighboring user 1002B (e.g., Uba Fayed).

The user-generated contents (e.g., the user-generated contents 152 of FIG. 1) of the submission form of the neighboring users 1002A-C may be locked. The interested user 226 may be charged a consideration for access to the user-generated contents 152 of the submission form of the neighboring users 1002A-C. The neighboring users 1002A-C may be compensated with the consideration. A percentage of the consideration may be allocated to the geo-spatial social network (e.g., through the finance module 220 of FIG. 2). The user-generated contents 152 of the submission form may be evaluated in response to a request of a moderator, prior to locking the user-generated contents.

Figure 11:
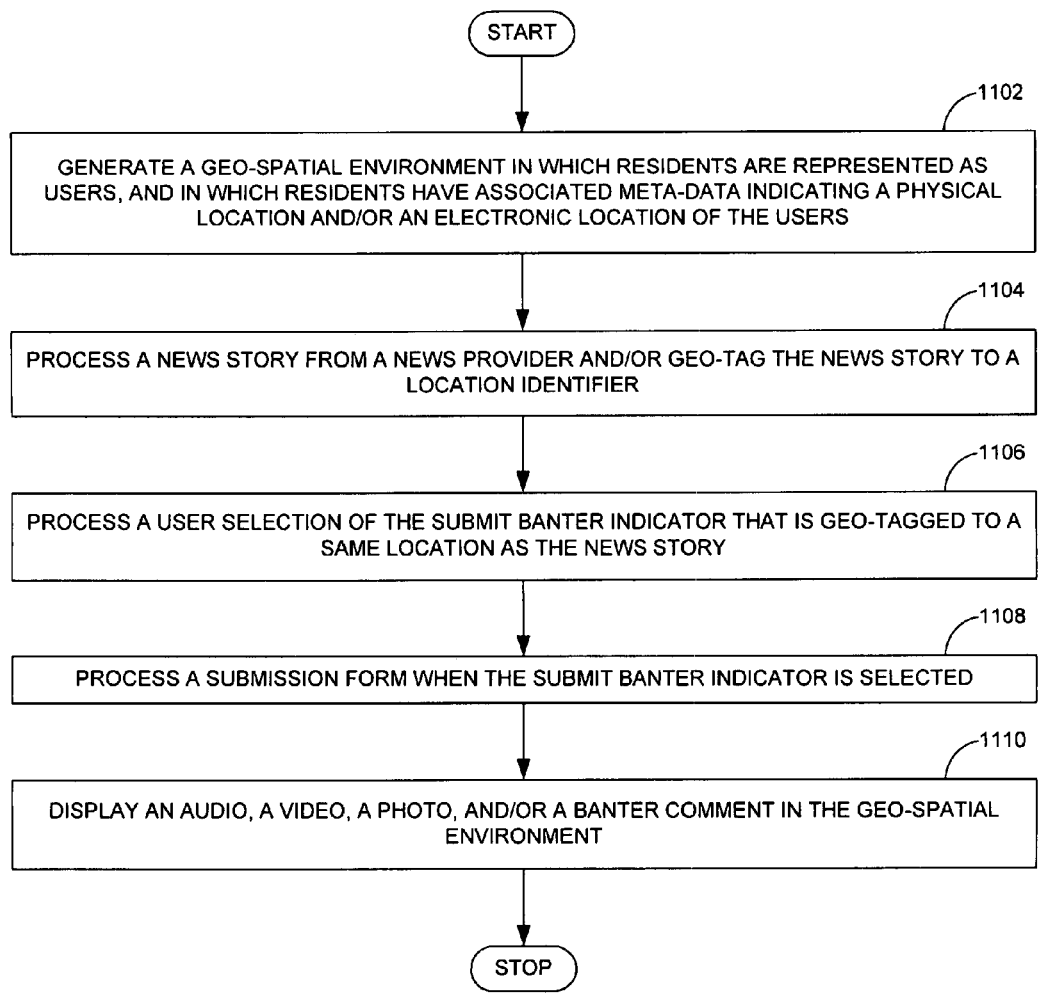
FIG. 11 is a process flow of generating, submitting, and displaying a user generated content in the geo-spatial environment, according to one embodiment.

FIG. 11 is a process flow of processing contents associated with the submission form of neighboring users (e.g., the neighboring users 228A-N of FIG. 2), according to one embodiment. In operation 1102, a geo-spatial environment (e.g., the geo-spatial environment 150 of FIG. 1) may be generated, in which residents are represented as users and in which residents have associated meta-data indicating a physical location and/or an electronic location of the users. In operation 1104, a news story (e.g., the hot news 102 of FIG. 1) from a news provider may be processed (e.g., using the news provider module 206 of FIG. 2) and/or geo-tagged to a location identifier.

In operation 1106, a user selection of the submit banter indicator that is geo tagged to the same location as the news story (e.g., the hot news 102 of FIG. 1) may be processed (e.g., using the banter module 312 of FIG. 3). In operation 1108, a submission form may be processed (e.g., using the submission module 300 of FIG. 3) when the submit banter indicator is selected. In operation 1110, an audio, a video, a photo, and/or a banter comment may be displayed (e.g., using the display module 212 and/or the publication module 214 of FIG. 2) in the geo-spatial environment 150.

Figure 12A:
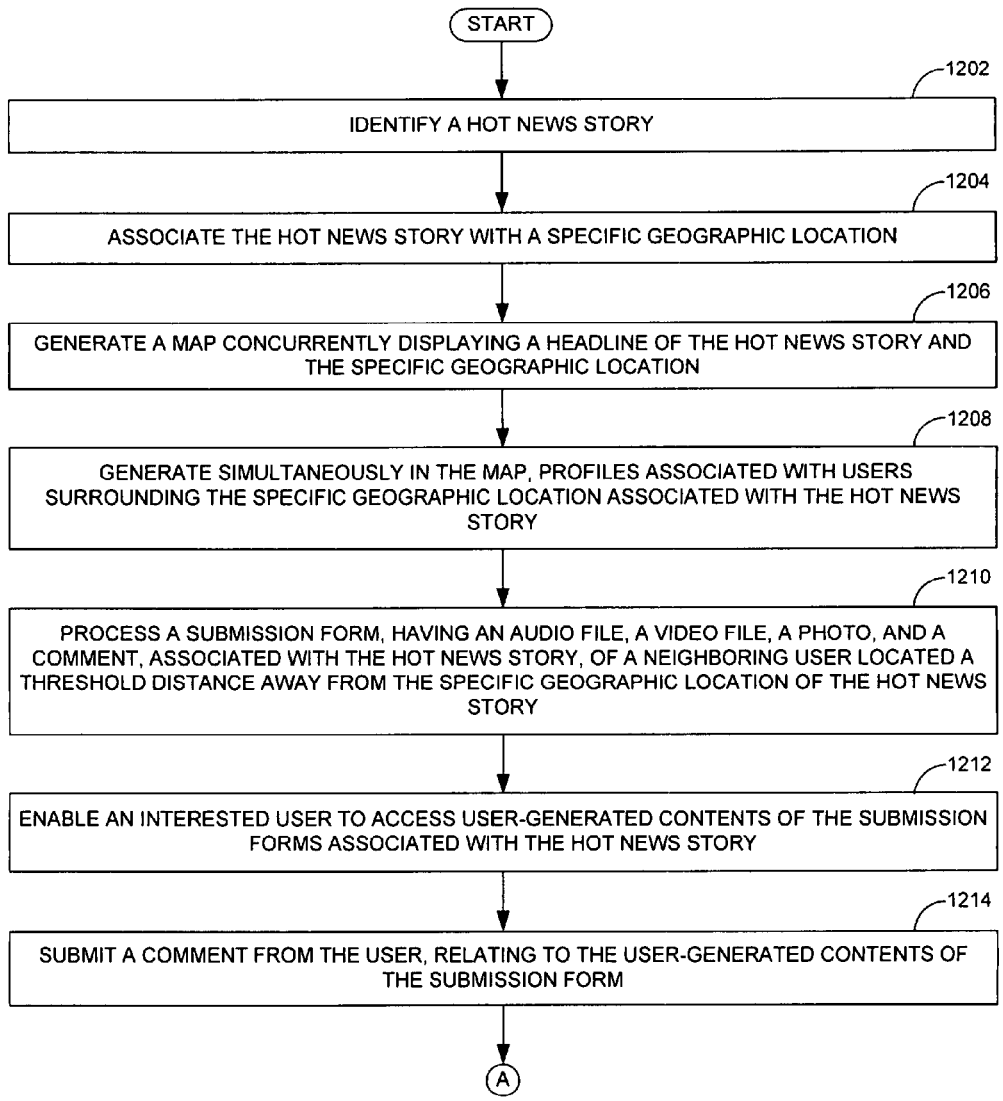
FIG. 12A is a process flow of the hot news module of FIG. 2, according to one embodiment.

FIG. 12A is a process flow of the hot news module 208 of FIG. 2, according to one embodiment. In operation 1202, a hot news story (e.g., the hot news 102 of FIG. 1) may be identified (e.g., using the news provider module 206 of FIG. 2). In operation 1204, the hot news story 102 may be associated with a specific geographic location (e.g., the hot news location 222 of FIG. 2). In operation 1206, a map (e.g., the geo-spatial map 620 of FIG. 6) concurrently displaying a headline of the hot news story 102 and the specific geographic location 222 may be generated (e.g., using the hot news module 208 of FIG. 2).

In operation 1208, profiles associated with users (e.g., the neighboring users 228A-N of FIG. 2) surrounding the specific geographic location associated with the hot news story 102 may be simultaneously displayed (e.g., using the display module 212 of FIG. 2) in the map. In operation 1210, a submission form, having an audio file, a video file, a photo, and/or a comment, associated with the hot news story 102, of a neighboring user 228A-N located a threshold distance away from the specific geographic location 222 of the hot news story 102 may be processed (e.g., using the submission module 300 of FIG. 3).

In operation 1212, an interested user (e.g., the interested user 226 of FIG. 2) may be enabled to access user-generated contents (e.g., the user-generated contents 152 of FIG. 1) of the submission forms associated with the hot news story 102. In operation 1214, a comment from the interested user 226, relating to the user-generated contents 152 of the submission form may be submitted (e.g., using the communication module 216 of FIG. 2).

Figure 12B:
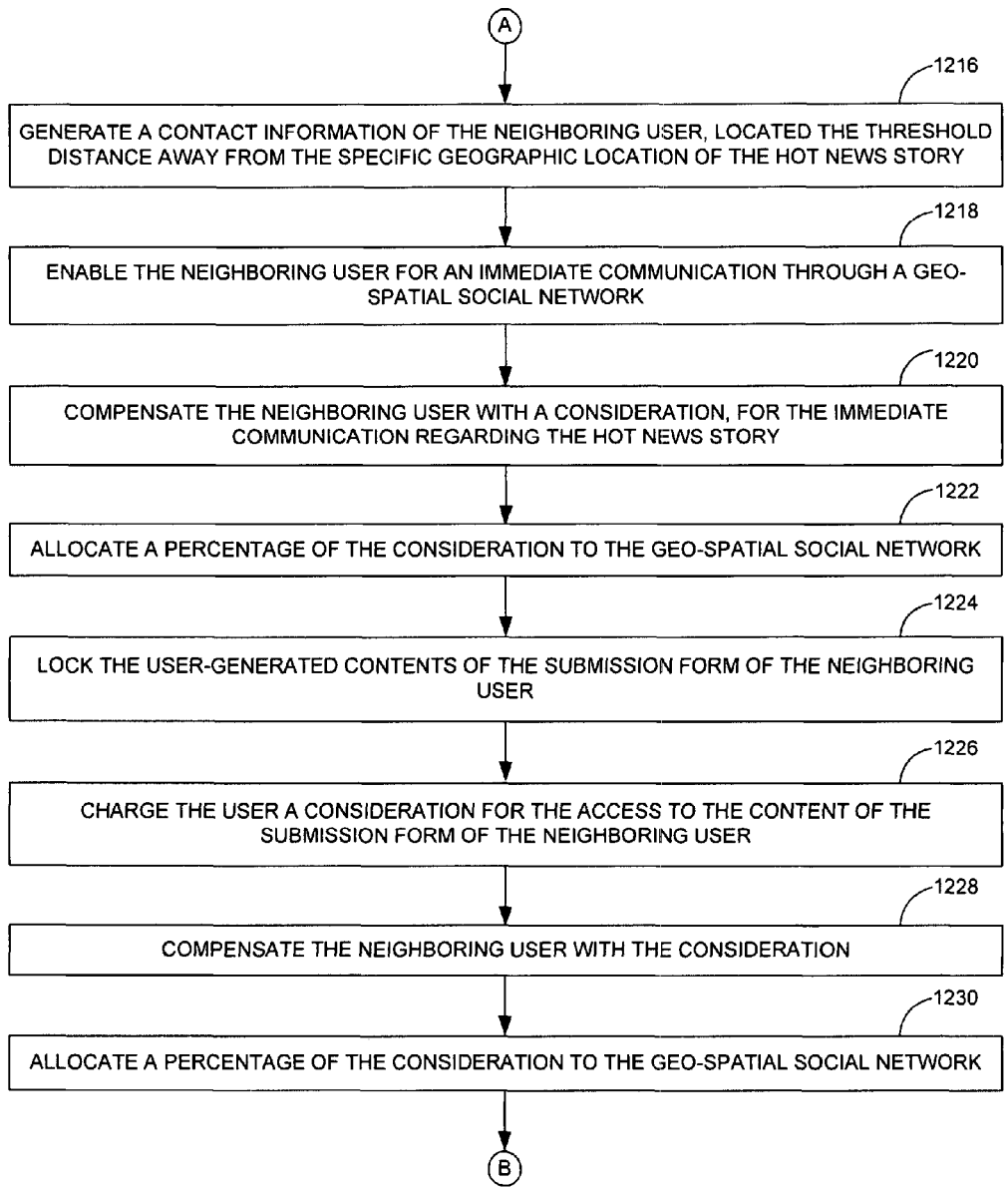
FIG. 12B is a continuation of the process flow of FIG. 12A, showing additional processes, according to one embodiment.

FIG. 12B is a continuation of the process flow of FIG. 12A, showing additional processes, according to one embodiment. In operation 1216, contact information of the neighboring users 228A-N, located the threshold distance away from the specific geographic location 222 of the hot news story 102 may be generated (e.g., using the contact database 218 of FIG. 2). In operation 1218, the neighboring user 228A-N may be enabled (e.g., using the communication module 216 of FIG. 2) for an immediate communication though a geo-spatial social network. In operation 1220, the neighboring user 228A-N may be compensated (e.g., using the finance module 220 of FIG. 2-4) with a consideration for the immediate communication regarding the hot news story 102. In operation 1222, a percentage of the consideration may be allocated (e.g., using the finance module 220 of FIG. 2-4) to the geo-spatial social network. In operation 1224, the user-generated contents 152 of the submission form of the neighboring user 228A-N may be locked (e.g., using the locked neighborhood banter entry 1006 of FIG. 10). In operation 1226, the user (e.g., the interested user 226) may be charged (e.g., using the finance module 220 of FIG. 2-4) a consideration for access to the content (e.g., the user-generated contents 152) of the submission form of the neighboring user 228A-N.

In operation 1228, the neighboring user 228A-N may be compensated (e.g., using the finance module 220 of FIG. 2-4) with the consideration (e.g., a financial disbursement). In operation 1230, a percentage of the consideration may be allocated to the geo-spatial social network.

Figure 12C:
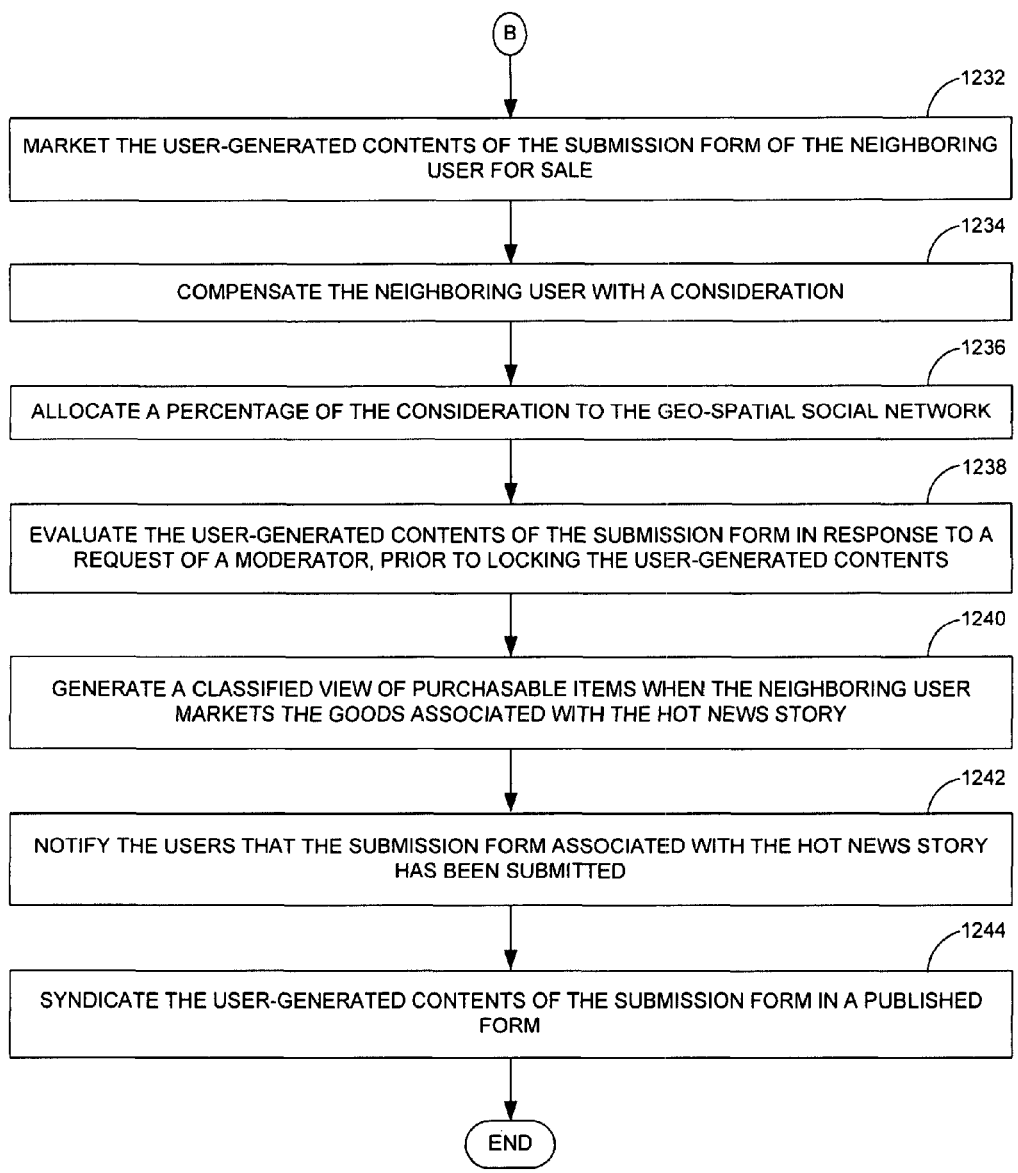
FIG. 12C is a continuation of the process flow of FIG. 12B, showing additional processes, according to one embodiment.

FIG. 12C is a continuation of the process flow of FIG. 12B, showing additional processes, according to one embodiment. In operation 1232, the user generated contents 152 of the submission form of the neighboring user 228A-N may be marketed for sale. In operation 1234, the neighboring user 228A-N may be compensated (e.g., using the finance module 220 of FIG. 2-4) with a consideration. In operation 1236, a percentage of the consideration may be allocated to the geo-spatial social network.

In operation 1238, the user-generated contents 152 of the submission form may be evaluated in response to a request of a moderator, prior to locking the user-generated contents 152. In operation 1240, a classified view of purchasable items may be generated when the neighboring user 228A-N markets goods associated with the hot news story 102. In operation 1242, the users (e.g., of the geo-spatial social network and/or the geospatial environment 150) may be notified (e.g., using the publication module 214 of FIG. 2) that the submission form associated with the hot news story 102 has been submitted (e.g., using the news provider module 206 of FIG. 2). In operation 1244, the user-generated contents 152 of the submission form may be syndicated (e.g., using the publication module 214 of FIG. 2) in a published media.

Figure 13:
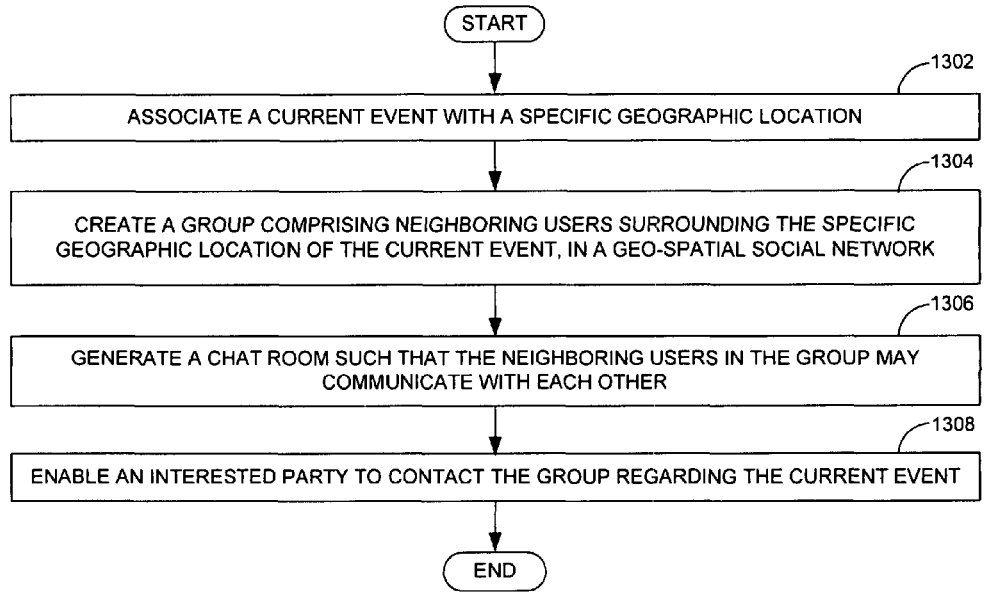
FIG. 13 is a process flow of an interested party contacting a group consisting of neighboring users surrounding a hot news location, according to one embodiment.

FIG. 13 is a process flow of an interested party (e.g., the interested user 226 of FIG. 2) contacting a group consisting of neighboring users (e.g., the neighboring users 228A-N of FIG. 2) surrounding a specific geographic location (e.g., the hot news location 222 of FIG. 2), according to one embodiment. In operation 1302, a current event (e.g., the hot news 102 of FIG. 1) may be associated (e.g., using the news provider module 206 of FIG. 2) with the specific geographic location (e.g., the hot news location 222 of FIG. 2). In operation 1304, a group comprising the neighboring users 228A-N surrounding the specific geographic location 222 of the current event in a geo-spatial social network may be created (e.g., using the contact database 218 of FIG. 2). In operation 1306, a chat room may be generated (e.g., using the banter module 312 of FIG. 3) such that the neighboring users 228A-N in the group may communicate with each other. In operation 1308, an interested party (e.g., the interested user 226 of FIG. 2)

may be enabled to contact (e.g., using the communication module 216 of FIG. 2) the group regarding the current event (e.g., the hot news 102).

In one aspect method for providing users of information with timely information about a news story related to the geographic locations of the users includes receiving a submission of a news story from the Internet via a computer network interface device. The news story includes a geographic location of the news story, a description of the details of the news story and information related to the marketing of goods associated with the news story. A contact database is searched to select users whose geographic locations indicate a proximity to the geographic location of the news story. The contact database is stored on a computer and includes electronic contact information and geographic location information for a plurality of users. The selected users are provided with the geographic location of the news stow, the description of the details of the news story, and the information related to the marketing of goods associated with the news story via the computer network interface device. An interested user is enabled to form an immediate communication in the form of an online interview with a neighboring user surrounding the specific geographic location of the news story. A contact information of users is generated. The contact information comprises an email address and a telephonic contact number. Other users are permitted to access the contact information of the user when the user makes a submission in order to permit immediate communication between the other user and the submitter user.

The description of the details of the news story may include an audio file, a video file, a photograph, and/or text. One of the selected users may be allowed to communicate with another of the selected users regarding the news story. One of the selected users may be allowed to upload comments, photographs, audio, and/or video associated with the news story. The step of providing the selected users with the description of the details of the news story may be accomplished using email, instant messaging, and/or by displaying it on a user interface.

In another aspect, a computer system for providing interested users with timely information about a news story occurring near the physical address of the interested users includes an interface to a first computer, the first computer being associated with a submitter of a news story. The news story includes a geographic location of the news story, a description of the details of the news story and information related to the marketing of goods associated with the news story. The computer system further includes an interface to a plurality of additional computers, (the additional computers being associated with interested users of the news story) and a contact database of information about potential interested users (the information includes an electronic address and a physical address for each of the potential interested users).

A processor includes software for receiving the news story via the interface to the first computer, searching the contact database to select interested users (whose physical addresses indicate a proximity to the geographic location of the news story) from among the potential interested users. The processor further includes software for electronically notifying the interested users about the news story via the interface to the additional computers, enabling an interested user to form an immediate communication in the form of an online interview with a neighboring user surrounding the specific geographic location of the news story, generating a contact information of users (the contact information comprises an email address and a telephonic contact number), and permitting other users to access the contact information of the user when the user makes a submission in order to permit immediate communication between at least the other user and the submitter user.

The description of the details of the news story may include an audio file, a video file, a photograph, and/or text. The processor may further include software for allowing one of the interested users to communicate with another of the interested users regarding the news story, allowing an interested user to upload comments, photographs, audio, and/or video associated with the news story, and/or allowing an interested user to upload photographs associated with the news story. The software may notify the interested users of the news story via email, instant messaging, and/or by displaying it on a user interface.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium).

For example, the various electrical structure and methods may be embodied using transistors, logic gates, and/or electrical circuits (e.g., Application Specific Integrated Circuitry (ASIC), Digital Signal Processor (DSP) circuitry, etc.).

For example, the news provider module 206, the hot news module 208, the feed module 210, the display module 212, the publication module 214, the communication module 216, the finance module 220, the submission module 300, the wiki module 302, the audio module 304, the video module 306, the photo module 308, the banter module 312 and other modules of FIGS. 1-13 may be enabled using a news provider circuit, a hot news circuit, a feed circuit, a display circuit, a publication circuit, a communication circuit, a finance circuit, a submission circuit, a wiki circuit, a audio circuit, a video circuit, a photo circuit, a banter circuit and other circuits using one or more of the technologies described herein.

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

What is claimed is:

1. A method of providing users with timely information about a news story related to geographic locations of the users, the method comprising:

receiving a submission of a news story from the Internet via a computer network interface device, the news story comprising a geographic location of the news story, a description of the details of the news story and information related to the description of items associated with the news story;

searching a contact database, the contact database stored on a computer and comprising electronic contact information and geographic location information of a plurality of users, to select users whose geographic locations indicate a proximity to the geographic location of the news story;

providing, via the computer network interface device, the selected users with the geographic location of the news story, the description of the details of the news story, and the information related to the description associated with the news story;

enabling an interested user to form an immediate communication in the form of an online interview with at least one of a neighboring user surrounding the specific geographic location of the news story;

generating a contact information of users, wherein the contact information comprises at least one of an electronic communication address and a telephonic contact number; and permitting other users to access the contact information of the user when the user makes a submission in order to permit immediate communication between at least the other user and the submitter user.

2. The method of claim 1, where:
the description of the details of the news story comprises an audio file.

3. The method of claim 1, where:
the description of the details of the news story comprises a video file.

4. The method of claim 1, where:
the description of the details of the news story comprises a photograph.

5. The method of claim 1, where:
the description of the details of the news story comprises text.

6. The method of claim 1, further comprising the step of:
allowing one of the selected users to communicate with another of the selected users regarding the news story.

7. The method of claim 1, further comprising the step of:
allowing one of the selected users to upload comments associated with the news story.

8. The method of claim 1, further comprising the step of:
allowing one of the selected users to upload photographs associated with the news story.

9. The method of claim 1, further comprising the step of:
allowing one of the selected users to upload audio associated with the news story.

10. The method of claim 1, further comprising the step of:
allowing one of the selected users to upload video associated with the news story.

11. The method of claim 1, where:
the step of providing the selected users with the description of the details of the news story is accomplished using email.

12. The method of claim 1, where:
the step of providing the selected users with the description of the details of the news story is accomplished using instant messaging.

13. The method of claim 1, where:
the step of providing the selected users with the description of the details of the news story is accomplished by displaying it on a user interface.

14. A computer system of providing interested users with timely information about a news story occurring near the physical address of the interested users, the computer system comprising:

an interface to a first computer, the first computer being associated with a submitter of a news story, the news story comprising a geographic location of the news story, a description of the details of the news story and information related to the promotion of an event associated with the news story;

an interface to a plurality of additional computers, the additional computers being associated with interested users of the news story;

a contact database of information about potential interested users, the information comprising an electronic address and a physical address for each of the potential interested users;

a processor comprising software to receive the news story via the interface to the first computer, for searching the contact database to select interested users, from among the potential interested users, whose physical addresses indicate a proximity to the geographic location of the news story, to electronically notify the interested users about the news story via the interface to the additional computers, to enable an interested user to form an immediate communication in the form of an online interview with at least one of a neighboring user surrounding the specific geographic location of the news story, to generate a contact information of users, wherein the contact information comprises at least one of a communication address and a voice contact number, and permitting other users to access the contact information of the user when the user makes a submission in order to permit immediate communication between at least the other user and the submitter user.

15. The computer system of claim 14, where:
the description of the details of the news story comprises an audio file.

16. The computer system of claim 14, where:
the description of the details of the news story comprises a video file.

17. The computer system of claim 14, where:
the description of the details of the news story comprises a photograph.

18. The computer system of claim 14, where:
the description of the details of the news story comprises text.

19. The computer system of claim 14, where:
the processor further comprises software for allowing one of the interested users to communicate with another of the interested users regarding the news story;

the processor further comprises software for allowing an interested user to upload comments associated with the news story;

the processor further comprises software for allowing an interested user to upload photographs associated with the news story;

the processor further comprises software for allowing an interested user to upload audio associated with the news story;

the processor further comprises software for allowing an interested user to upload video associated with the news story;

the software notifies the interested users of the news story via email;

the software notifies the interested users of the news story via instant messaging; and the software notifies the interested users of the news story by displaying it on a user interface.

* * * * *